(12) United States Patent
Akiyama et al.

(10) Patent No.: US 7,632,017 B2
(45) Date of Patent: Dec. 15, 2009

(54) LINEAR GUIDE

(75) Inventors: Masaru Akiyama, Kanagawa (JP); Nobuhide Kurachi, Kanagawa (JP); Jun Matsumoto, Kanagawa (JP); Toshio Yoshida, Saitama (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 766 days.

(21) Appl. No.: 11/080,679

(22) Filed: Mar. 16, 2005

(65) Prior Publication Data
US 2006/0029305 A1    Feb. 9, 2006

(30) Foreign Application Priority Data

Mar. 16, 2004 (JP) .......................... P. 2004-075166
Jun. 18, 2004 (JP) .......................... P. 2004-180636
Feb. 23, 2005 (JP) .......................... P.2005-047143

(51) Int. Cl.
*F16C 29/08* (2006.01)

(52) U.S. Cl. .......................................... 384/45; 384/44

(58) Field of Classification Search ................... 384/43, 384/44, 45
See application file for complete search history.

(56) References Cited

U.S. PATENT DOCUMENTS 6,132,093 A * 10/2000 Michioka et al. .............. 384/45

FOREIGN PATENT DOCUMENTS

| JP | 5-209617 A | 8/1993 |
|----|------------|--------|
| JP | 9-72335 A | 3/1997 |
| JP | 2865854 B2 | 3/1999 |
| JP | 2003-090338 A | 3/2003 |
| JP | 2003-194057 A | 7/2003 |

* cited by examiner

Primary Examiner—William C Joyce
(74) Attorney, Agent, or Firm—Sughrue Mion, PLLC

(57) ABSTRACT

A slider has a slider main body which has a circulation sleeve whose inner portion forms a rolling element passage by being inserted into a hole penetrating in an axial direction, an end cap which has an outer peripheral track face of a direction changing passage in a curved shape for communicating a load track between two rolling element rolling grooves and the rolling element passage, and is fixed to an axial end portion of the slider main body, and an inner peripheral track member which has an inner peripheral track face of the direction changing passage, and is fitted to the end cap. An end portion of the circulation sleeve is provided with a plurality of positioning projected portions, and the end cap and the inner peripheral track member are provided with recess portions fitted with the positioning projected portions.

6 Claims, 20 Drawing Sheets

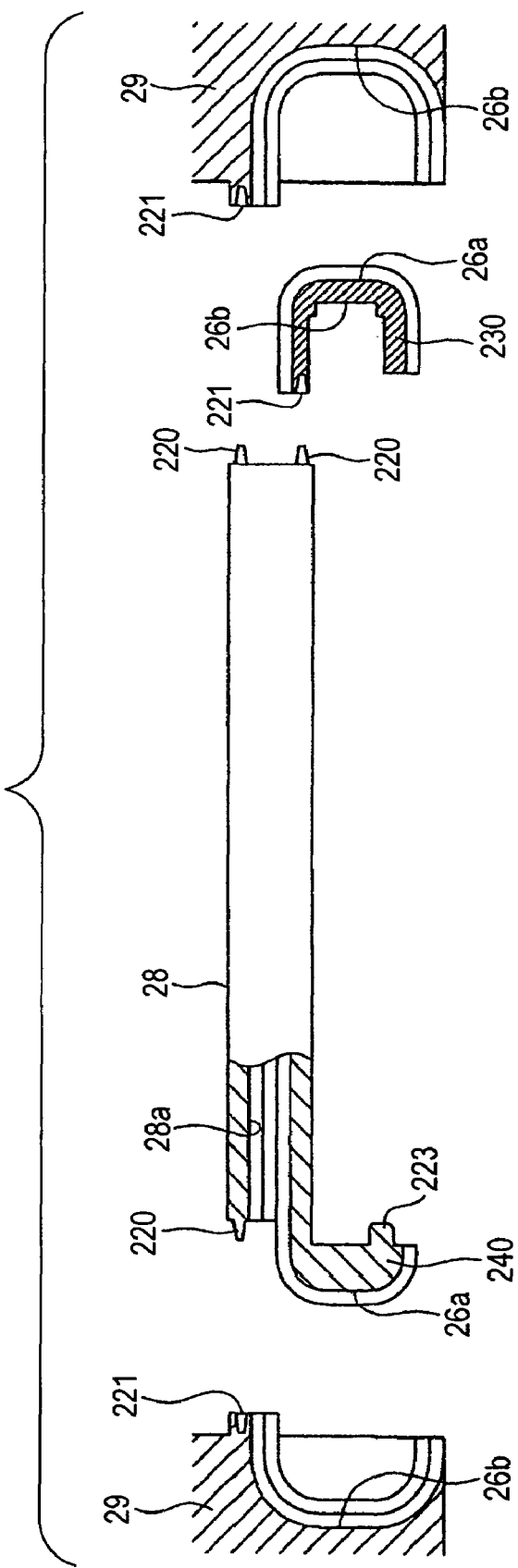

LINEAR GUIDE

BACKGROUND OF THE INVENTION

1. Field of the Invention

The present invention relates to a linear guide used in, for example, a machine tool, an industrial machine field or the like.

2. Description of the Related Art

There is known a linear guide of this kind of a related art as shown in, for example, FIG. 35.

The linear guide is provided with a guide rail 1 extending in an axial direction and a slider 2 being laid across the guide rail 1 so as to relatively move along the axial direction. Two side faces in a width direction of the guide rail 1 are formed with rolling element rolling grooves 3 respectively extended in the axial direction by two upper and two lower streaks thereof on one side, that is, four streaks in total, and a slider main body 2A of the slider 2 is formed with rolling element rolling grooves 5 respectively opposed to the rolling element rolling grooves 3 at inner side faces of two sleeve portions 4 thereof. A number of rollers 6 as rolling elements are rollably charged between the two rolling element rolling grooves 3, 5 and the slider 2 is made to be able to move on the guide rail 1 relatively along the axial direction through rolling movement of the rollers 6.

In accordance with the movement, the rollers 6 interposed between the guide rail 1 and the slider 2 are rolled to move to end portions in the axial direction of the slider 2 and in order to continuously move the slider 2 in the axial direction, it is necessary to infinitely circulate the rollers 6. For that purpose, there are formed two upper and two lower (a total of four) of holes 7 penetrated respectively in the axial direction into the sleeve portions 4 on both sides of the slider main body 2A and the holes 7 are inserted with circulation sleeves 8 whose inner portions form passages (rolling element passages) of the rollers 6, two ends in the axial direction of the slider main body 2A are fixed with a pair of end cap 9 respectively functioning rolling element circulating parts by screws or the like, and the end caps 9 are formed with direction changing passages 9a (referred to FIG. 3 and FIG. 4) curved in a shape of a semi-circular arc for communicating intervals between the two rolling element rolling grooves 3, 5 and the rolling element passages 8a to thereby form infinite circulation tracks of the rollers 6.

The direction changing passages 9a provided at the end cap 9 for communicating the rolling element passages 8a on an upper side and the intervals between the two rolling element rolling grooves 3, 5 on a lower side and the direction changing passages 9a for communicating the rolling element passages 8a on a lower side and the intervals between the two rolling element rolling grooves 3, 5 on an upper side are formed to intersect such that the direction changing passages 9a do not interfere with each other. Meanwhile, in fixing the end cap 9 to the end face of the slider main body 2A, positioning of the circulation sleeve 8 (rolling element passage 8a) on a side of the slider main body 2A and the direction changing passage 9a on a side of the end cap 9 becomes important in ensuring smooth circulation of the rollers 6.

There is proposed a technology with regard to positioning in this way, in which, for example, two ends of a sleeve (circulation tube) are formed with chipped wall portions in a shape of a chipped circle, opening ends of direction changing passages of side plates (end caps) are formed with projected portions coinciding with the chipped wall portions of the sleeve, and the projected portions are fitted to insides of circular holes (inserting holes of the sleeve) of a casing (slider main body) and the chipped wall portions of the sleeve to thereby position the casing and the sleeves and the side plates each other (for example, refer to Japanese Patent Publication No. 2865854).

In this case, the casing, the sleeve and the side plate are constituted by separate members. Therefore, in integrating the sleeve, one end face of the casing is attached with the side plate, the sleeve is inserted into the circular hole penetrated to the casing from other end face thereof, and at that occasion, a phase is matched such that a shape of an inner periphery of the sleeve and a shape of an opening end of the direction changing passage of the side plate coincide with each other.

Japanese Patent Publication No. 2865854, JP-A-5-209617 and JP-A-9-72335 are referred to as related arts.

However, according to Japanese Patent Publication No. 2865854, when positioning of connecting portions of the circulation sleeve (rolling element passage) and the direction changing passage on the side of the end cap is going to be carried out accurately in order to make circulation of rollers smooth, it is necessary to promote an accuracy of fitting together the projected portion and the chipped wall portion. Therefore, unless the phase of the circulation sleeve is matched accurately, the end cap and the circulation sleeve are not integrated. Therefore, in inserting the circulation sleeve into the hole of the slider main body, the phase of the circulation sleeve needs to match accurately. In this case, operability is deteriorated and time is taken in integrating operation, which amounts to an increase in cost.

Further, in Japanese Patent Publication No. 2865854, the chipped wall portion provided at the circulation sleeve and the projected portion provided at the end cap are fitted together only at one location. Therefore, when the circulation sleeve is shifted by play by a clearance at the fitting portion, there is a concern that positioning of the rolling element passage in the circulation sleeve and the direction changing passage on the side of the end cap is not carried out accurately.

Further, it is difficult to determine the phase in a peripheral direction of the circulation sleeve at a glance and there is a concern of attaching the circulation sleeve to the hole of the slider main body by shifting the phase of the circulation sleeve by 180°. In this case, the chipped wall portion of the end portion of the circulation sleeve and the projected portion on the side of the opening end of the direction changing passage of the side plate (end cap) cannot be fitted together. Therefore, the integration cannot be carried out. Therefore, it is necessary to draw the circulation sleeve temporarily from the hole of the slider main body and reattach the circulation sleeve thereto by making the phase of the circulation sleeve correct again.

In this way, when the circulation sleeve is attached to the hole of the slider main body, it is necessary to pay close attention such that the direction of the circulation sleeve is not mistaken and integrating operation becomes complicated.

Further, in the case of the linear guide of the related art explained in reference to FIG. 35, when a circular arc track of a direction changing passage 10 provided at the end cap 9 and a linear track of the rolling element passage 8a in the circulation sleeve 8 are connected, since normally, the end cap 9 and the circulation sleeve 8 are die molded products of resin, a corner portion is provided with facing to prevent burr from being produced in molding or in using at the corner portion. Particularly, when facing 11 is provided at a part of an inner peripheral guide face 10a of the direction changing passage 10 connected with the rolling element passage 8a, as shown by FIG. 36, even when the end cap 9 is positioned to a regular position with respect to the circulation sleeve 8, a stepped difference is brought about at the facing portion 11. In this case, smooth circulation of the roller 6 is hampered and the operability is deteriorated.

SUMMARY OF THE INVENTION

It is an object of the invention to provide a linear guide which is capable of ensuring smooth circulation of a roller by enabling to accurately positioning of a circulation sleeve on a side of a slider main body and a direction changing passage on a side of an end cap, and is capable of promoting integration operability.

Further, it is an object of the invention to provide a linear guide which is capable of achieving an excellent operability by ensuring smooth circulation of a roller.

The invention provides a linear guide having a guide rail which has a rolling element rolling groove extending in an axial direction; and a slider which has a rolling element rolling groove opposed to the rolling element rolling groove of the guide rail, and is laid across the guide rail so as to relatively move along the axial direction through rolling movements of a number of rolling elements inserted into a load track formed between the two rolling element rolling grooves, wherein the slider has: a slider main body which has a circulation sleeve whose inner portion forms a rolling element passage by being inserted into a hole penetrating in the axial direction, an end cap which has an outer peripheral track face of a direction changing passage in a curved shape for communicating the load track and the rolling element passage, and is fixed to an axial end portion of the slider main body, and an inner peripheral track member which has an inner track face of the direction changing passage, and is fitted to a side of the end cap directed to a side of an end face of the slider main body, and wherein at least one of end portions of the circulation sleeve is provided with a plurality of positioning locking portions, and the end cap and the inner peripheral track member are provided with locked portions fitted with the positioning locking portions.

Therefore, the plurality of positioning locking portions on a side of the circulation sleeve are respectively fitted to the locked portion on a side of the end cap and the locked portion on a side of the inner peripheral track member. Therefore, positioning of the circulation sleeve and an end cap and the inner peripheral track member can accurately and firmly be carried out. As a result, smooth circulation of the roller is ensured and the operability of the linear guide can be improved.

In the linear guide, the plurality of positioning locking portions are arranged to be respectively axis-symmetrical with respect to a center axis of the rolling element passage. Therefore, even when a phase of the circulation sleeve is shifted by 180°, the positioning locking portions of the circulation sleeve and the locked portions provided at the end cap and the inner peripheral track member can be fitted with each other. Therefore, it is not necessary to paying attention to the phase of the circulation sleeve when the linear guide is integrated. As a result, the integrating operation can be facilitated.

In the linear guide, another end portion of the circulation sleeve is integrally formed with the inner peripheral track member. Therefore, the phase of the circulation sleeve is known at a glance by the inner peripheral track member. Therefore, the linear guide is not integrated by mistaking the phase of the circulation sleeve. Therefore, the integrating operation can further be facilitated.

In the linear guide, the locking portion has a projected portion at either one of a side of an end cap/a return guide and a side of the circulation sleeve, and a recess portion to be engaged with the projected portion at another side thereof, and at least one of the projected portion and the recess portion has an inclined face along a peripheral direction of an end face of the circulation sleeve. Therefore, positioning of the circulation sleeve on the side of the slider main body and the direction changing passage on the side of the end cap can accurately be carried out. As a result, smooth circulation of the roller can be ensured. Further, when the phase of the circulation sleeve is shifted within a range of inclination of the inclined face, accurate positioning can be carried out by engaging the projected portion with the recess portion easily by pushing the circulation sleeve. As a result, an integration operability can be promoted.

In the linear guide, the load tracks are formed by two upper and two lower streaks on one side, four streaks in total, the rolling element passages are formed by two upper and two lower passages on one side, four passages in total, the inner peripheral track member is formed by a first return guide and a second return guide which are fitted to a side of the end cap member directed to the side of the end face the slider main body, a side of one return guide of the first return guide and the second return guide is formed with the direction changing passage for communicating the rolling element passage on an upper side and the load track on a lower side, and a side of another return guide is formed with the direction changing passage for communicating the rolling element passage on a lower side and the load track on an upper side.

Further, In the linear guide, the first return guide and the second return guide are fitted in the axial direction of the guide rail in a state of being arranged substantially orthogonal to each other by constituting substantially a rectangular shape on a short side thereof provided with the inner peripheral track face of the rolling element in view from the axial direction of the guide rail.

Therefore, a request for high molding accuracy can be avoided by simplifying shapes of the first return guide and the second return guide, and operation of fitting the first return guide and the second return guide in the axial direction can easily be carried out. As a result, efficient formation of the integrating operation. Therefore, a reduction in fabrication cost can be achieved.

The invention also provides a linear guide having a guide rail which has a rolling element rolling groove extending in an axial direction, and a slider which has a rolling element rolling groove opposed to the rolling element rolling groove of the guide rail, and is laid across the guide rail so as to relatively move along the axial direction through rolling movements of a number of rolling elements inserted into a load track formed between the two rolling element rolling grooves, wherein the slider has: a slider main body which has a circulation sleeve whose inner portion forms a rolling element passage by being inserted into a hole penetrating in the axial direction, an end cap which has an outer peripheral track face of a direction changing passage in a curved shape for communicating the load track and the rolling element passage, and is fixed to an axial end portion of the slider main body, and an inner peripheral track member which has an inner track face of the direction changing passage, and is fitted to a side of the end cap directed to a side of an end face of the slider main body, wherein an opening end of the direction changing passage is formed with a part of the circulation sleeve.

Therefore, a stepped difference can be avoided to be produced at a part of connecting the end cap and the circulation sleeve. As a result, smooth circulation of the rolling element is ensured and an excellent operability can be achieved.

In the linear guide, it is preferable that the part of the circulation sleeve is formed integrally with the end cap, and is in a projected shape.

Further, in the linear guide, the circulation sleeve is shorter in length than the slider main body.

Further, in the linear guide, the circulation sleeve is shorter in length of the axial direction than the slider main body, and the part of the circulation sleeve formed integrally with the end cap is inserted into the hole of the slider main body.

Therefore, as thickness in the axial direction of the end cap can be minimized. Therefore, a length of a total of the slider can be shortened. As a result, compact formation of the linear guide can be achieved.

The invention also provides a linear guide having a guide rail which has a rolling element rolling groove extending in an axial direction, and a slider which has a rolling element rolling groove opposed to the rolling element rolling groove of the guide rail, and is laid across the guide rail so as to relatively move along the axial direction through rolling movements of a number of rolling elements inserted into a load track formed between the two rolling element rolling grooves, wherein the slider has: a slider main body which has a circulation sleeve whose inner portion forms a rolling element passage by being inserted into a hole penetrating in the axial direction, an end cap which has an outer peripheral track face of a direction changing passage in a curved shape for communicating the load track and rolling element passage, and is fixed to an axial end portion of the slider main body, and an inner peripheral track member which has an inner track face of the direction changing passage, and is fitted to a side of the end cap directed to a side of an end face of the slider main body, wherein an axial end portion of the circulation sleeve is provided with a plurality of fitting portions for positioning, the end cap is provided with a fitted portion which fits with the fitting portion by recess and projection fitting, and a projected portion of the fitting portion or the fitted portion is arranged to be unable to fit to an inner portion of the circulation sleeve on a side of a counter member.

Therefore, positioning of the circulation sleeve and the end cap can accurately and firmly be carried out. As a result, smooth circulation of the rolling element is ensured and the operability of the linear guide can be improved. Further, the projected portion of the fitting portion or the fitted portion for positioning is arranged to be unable to fit to the inner portion of the circulation sleeve. Therefore, in positioning, the projected portion can firmly be prevented from being erroneously fitted to the inner portion of the circulation sleeve.

Further, in the linear guide, it is preferable that the rolling element is a roller.

BRIEF DESCRIPTION OF THE DRAWINGS

FIG. 5A is an explanatory view before engagement and FIG. 5B is an explanatory view after engagement;

FIG. 6A is an explanatory view before engagement and FIG. 6B is an explanatory view after engagement;

FIG. 7A is a view viewing an end portion of a circulation sleeve from an axial direction and FIG. 7B is a view viewing the end portion of the circulation sleeve from a diameter direction;

FIG. 12A is a view showing a state of bonding half divided members of the circulation sleeve, and FIG. 12B is a view showing a state before bonding the half divided members of the circulation sleeve;

FIG. 16 is a disassembled view of a circulation sleeve integrating an end cap, an inner peripheral track member and other inner peripheral track member;

FIG. 17A is a view showing a state of bonding half divided members of the circulation sleeve and FIG. 17B is a view showing a state before bonding the half divided members of the circulation sleeve;

DETAILED DESCRIPTION OF THE PREFERRED EMBODIMENTS

First Embodiment

Figure 1:
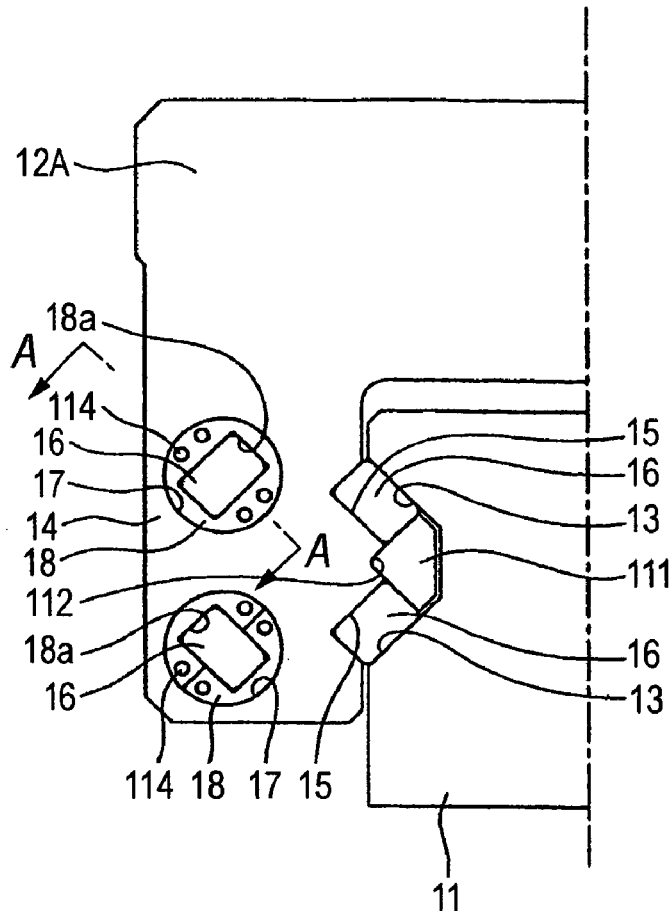
FIG. 1 is an explanatory view for explaining a projected portion on a side of a circulation sleeve of a linear guide according to a first embodiment.
Figure 2:
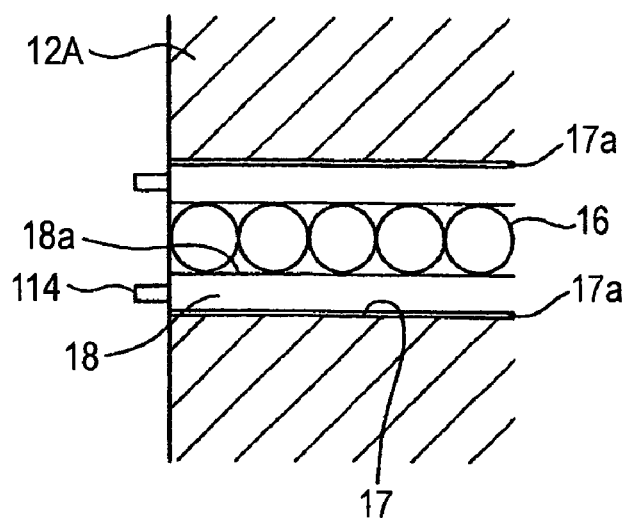
FIG. 2 is a sectional view taken along a line A-A.
Figure 3:
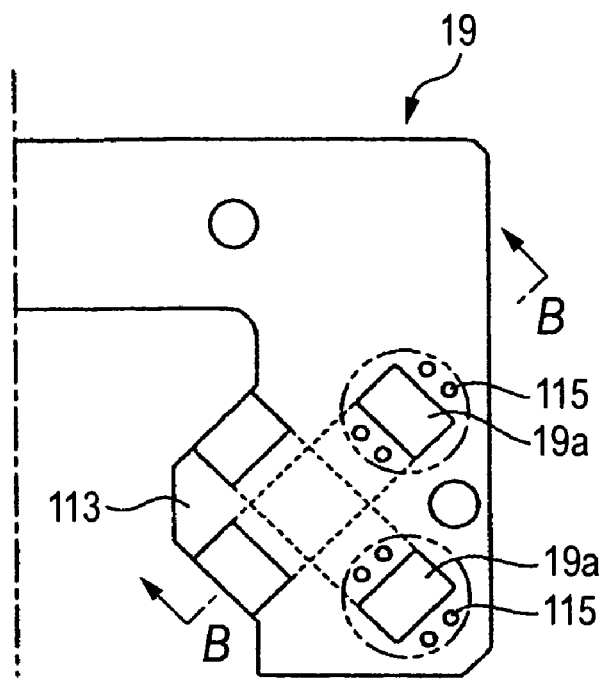
FIG. 3 is an explanatory view for explaining a recess portion on a side of an end cap.
Figure 4:
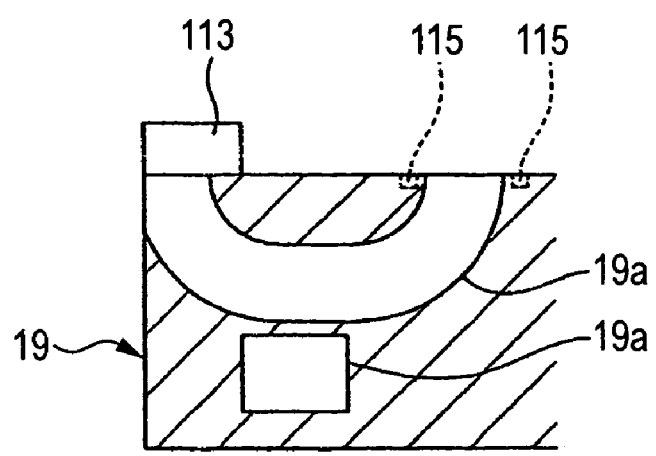
FIG. 4 is a sectionals view taken along a line B-B of FIG. 3.
Figure 5A:
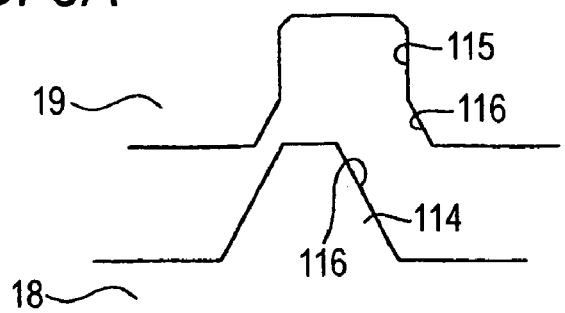
FIG. 5A and FIG. 5B are explanatory views for explaining an example of a structure of engaging a projected portion and a recess portion.
Figure 5B:
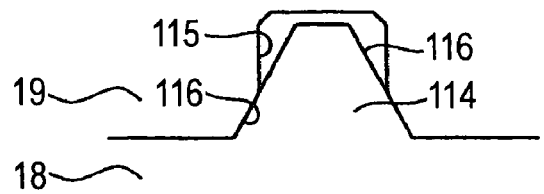
Figure 6A:
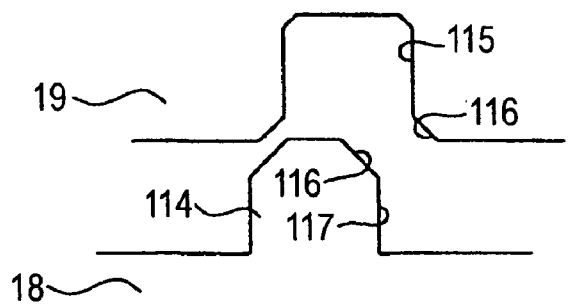
FIG. 6A and FIG. 6B are explanatory views for explaining a modified example of a structure of engaging a projected portion and a recess portion.
Figure 6B:
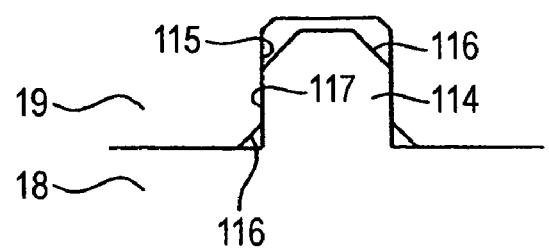
Figure 7A:
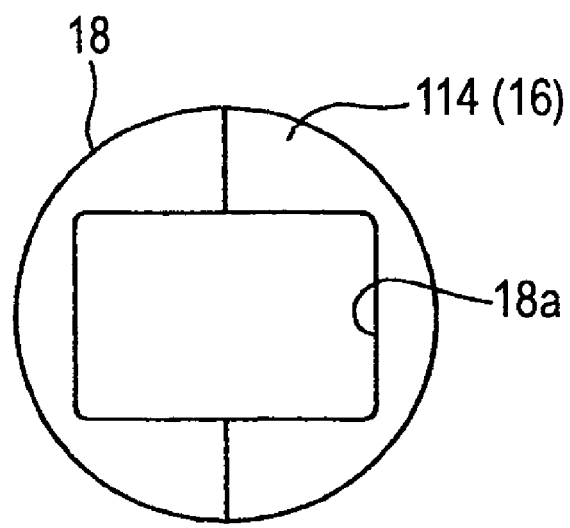
FIG. 7A and FIG. 7B are explanatory views for explaining a modified example of a projected portion.
Figure 7B:
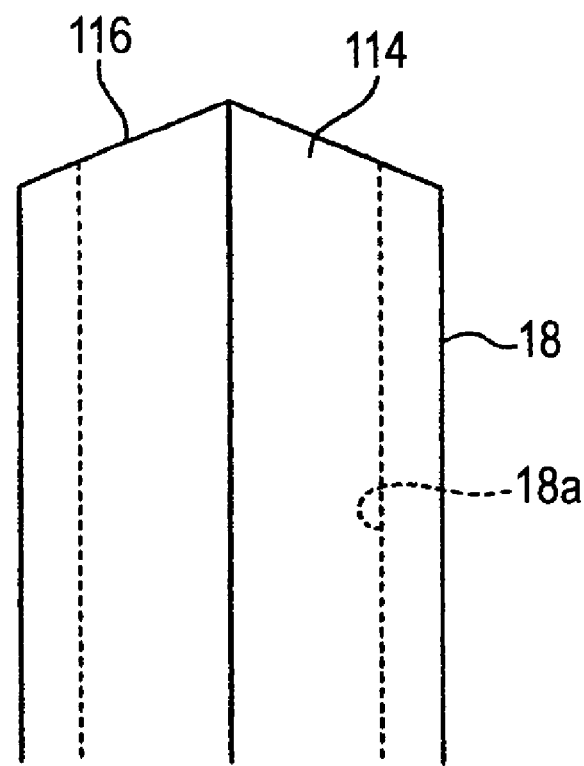
Figure 8:
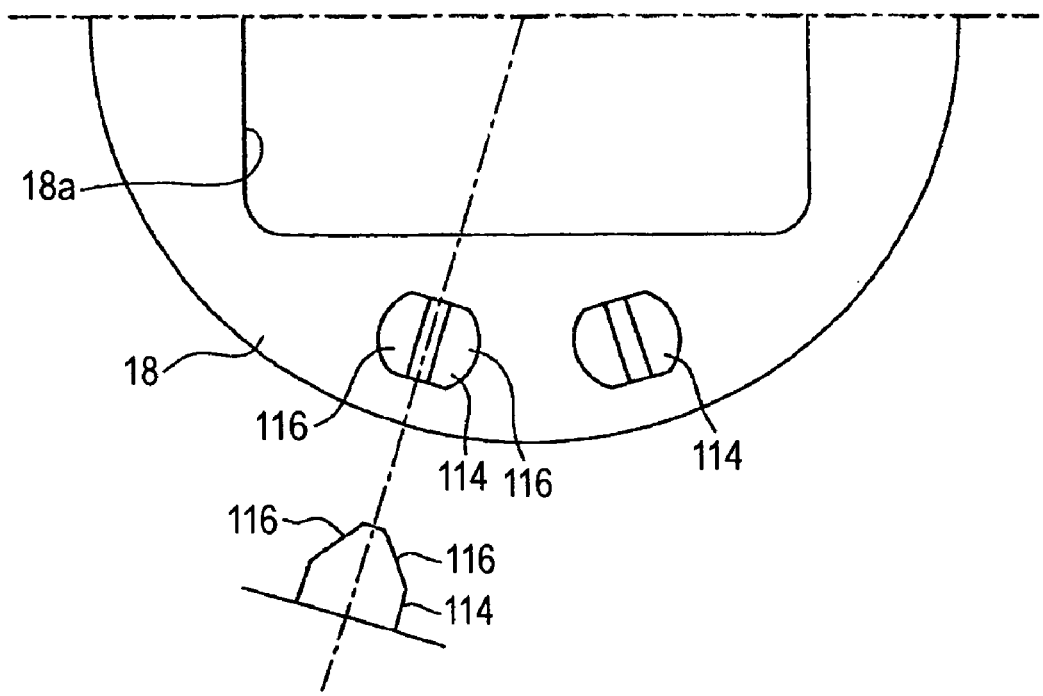
FIG. 8 is an explanatory view for explaining an example of forming an inclined face.
Figure 9:
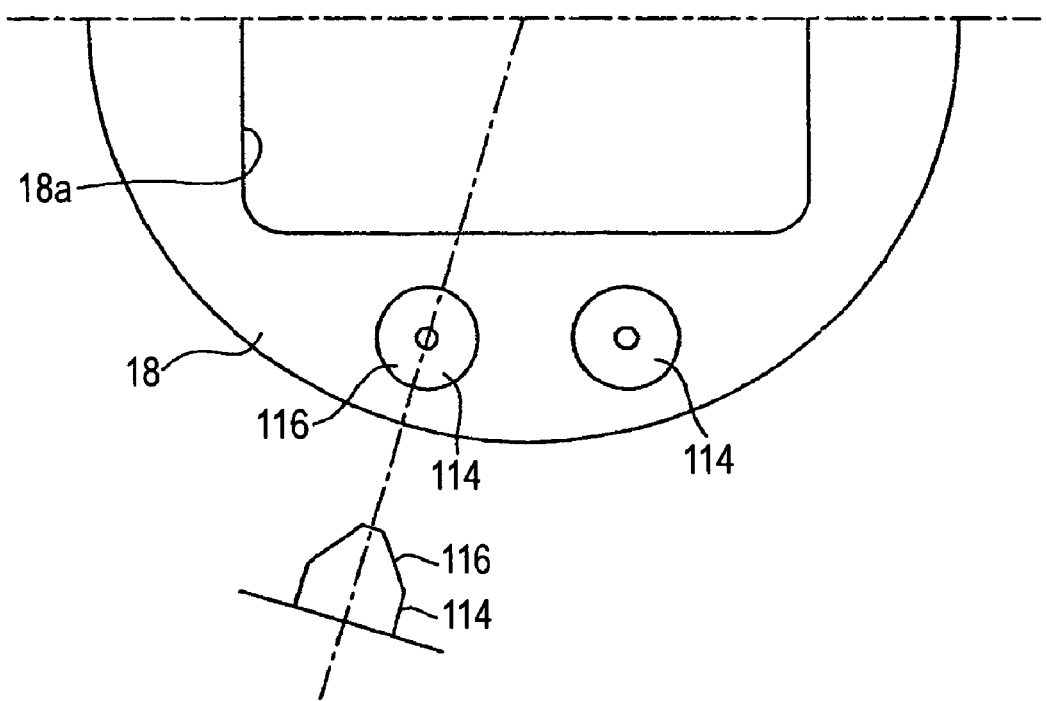
FIG. 9 is an explanatory view for explaining an example of forming an inclined face.

A first embodiment of the invention will be explained in reference to FIG. 1 through FIG. 9. FIG. 1 is an explanatory view for explaining a projected portion on a side of a circulation sleeve of a linear guide according to the first embodiment, FIG. 2 is a sectional view taken along a line A-A of FIG. 1, FIG. 3 is an explanatory view for explaining a recess portion on a side of an end cap, FIG. 4 is a sectional view taken along a line B-B of FIG. 3, FIG. 5A and FIG. 5B are explanatory views for explaining an example of a structure of engaging a projected portion and a recess portion, FIG. 6A and FIG. 6B are explanatory views for explaining a modified example of a structure of engaging a projected portion and a recess portion, FIG. 7A and FIG. 7B are explanatory views for explaining a modified example of a projected portion, and FIG. 8 and FIG. 9 are explanatory views for explaining examples of forming inclined faces.

A linear guide of the embodiment is provided with a guide rail 11 extending in an axial direction and a slider 12 being laid across the guide rail 11 so as to relatively move along an axial direction. Two side faces in a width direction of the guide rail 11 are formed with rolling element rolling grooves 13 respectively extended in the axial direction by two upper and two lower streaks on one side, that is, four streaks in total, a slider main body 12A of the slider 12 is formed with rolling element rolling grooves 15 respectively opposed to the rolling element rolling grooves 13 at inner side faces of two sleeve portions 14 thereof. A number of rollers 16 as rolling elements are rollably charged between the two rolling element rolling grooves 13, 15, and the slider 12 is made to be able to relatively move on the guide rail 11 along the axial direction through rolling of the rollers 16.

Although the rollers 16 interposed between the guide rail 11 and the slider 12 are rolled to move to end portions in the axial direction of the slider 12 in accordance with the movement, in order to continuously move the slider 12 in the axial direction, it is necessary to infinitely circulate the rollers 16. For that purpose, two upper and two lower (a total of four) of holes 17 respectively penetrating in the axial direction are formed at insides of the sleeve portions 14 on the both sides of the slider main body 12A and circulation sleeves 18 inner portions of which are made to constitute passages (rolling element passages) 18a of the rollers 16 are inserted into the holes 17, a pair of end caps 19 as rolling element circulating parts are fixed respectively to both ends in the axial direction of the slider main body 12A via screws or the like, the end caps 19 are formed with direction changing passages curved in a shape of a semicircular arc for communicating intervals between the two rolling element rolling grooves 13, 15 and the rolling element passages 18a to thereby form an infinite circulation track of the rollers 16.

According to the linear guide 110 of the embodiment, as shown by FIG. 1, the circulation sleeves 18 made of resin are inserted into the holes 17 at four locations penetrated to the slider main body 12A, and inner peripheral portions of the circulation sleeves 18 are formed with the rolling element passages 18a having a square section through which the roller 16 can pass with more or less clearances therebetween. The circulation sleeve 18 is brought into a state of being mounted with members in a half divided shape in a diameter direction. A length of the circulation sleeve 18 is made to be a length substantially the same as that of the slider main body 12A, further, as shown by FIG. 2, clearances 17a are provided between an outer peripheral face of the circulation sleeve 18 and an inner peripheral face of the hole 17.

Holding members 111 for holding the upper and lower rollers 16 are interposed between the two rolling element rolling grooves 13, 15 on upper sides and the two rolling element rolling grooves 13, 15 on lower sides and end portions in the axial direction of the holding members 111 are provided with grooves 112 for positioning the end caps 19. As shown by FIG. 3 and FIG. 4, direction changing passages 19a of the end caps 19 for communicating the rolling element passages 18a on upper sides and intervals between the two rolling element rolling grooves 13, 15 on lower sides and direction changing passages 19a for communicating the rolling element passages 18a on lower sides and intervals between the two rolling element rolling grooves 13, 15 on upper sides are formed to intersect three-dimensionally such that the direction changing passages 19a do not interfere with each other. Further, faces of the end caps 19 directed to sides of the slider main body 12A are projected with positioning projections 113 fitted to the positioning grooves 112.

Here, according to the embodiment, projected portions 114 are provided at both end portions of the circulation sleeve 18, recess portions 115 engaged with the projected portion 114 are provided at surroundings of opening ends of the direction changing passages 19a of the end cap 19, further, as shown by FIG. 5A and FIG. 5B, inclined faces 116 along peripheral directions of end faces of the circulation sleeve 18 are provided at the projected portions 114 and the recess portions 115. Further, the positioning projection 113 of the end cap 19 is fitted to the positioning groove 112 on one end face of the slider main body 12A, under the state, the circulation sleeve 18 is inserted into the hole 17 from other end face of the slider main body 12A, and the projected portion 114 of one end portion of the circulation sleeve 18 is engaged with the recess portion 115 on a side of the end cap 19 to thereby support the circulation sleeve 18 in a state of providing the clearances 17a between the circulation sleeve 18 and the hole 17.

Thereby, positioning of the rolling element passage 18a in the circulation sleeve 18 and the direction changing passage 19a on the side of the end cap 19 can accurately be carried out and smooth circulation of the rollers 16 can be ensured. Further, since the projected portion 114 and the recess portion 115 are provided with the inclined faces 116 along the peripheral direction of the end face of the circulation sleeve 18, when the phase of the circulation sleeve 18 is constituted by a shift within a range of inclination of the inclined face 116, accurate positioning can be carried out by engaging the projected portion 114 with the recess portion 115 easily by pushing the circulation sleeve 18. As a result, integrating operability can be promoted.

Further, the linear guide of the embodiment is not limited to the above-described embodiment but can pertinently be changed within the range not deviated from the gist of the invention. For example, although according to the above-described embodiment, there is adopted the case in which a total face of the face along the peripheral direction of the projected portion 114 is constituted by the inclined face 116 as an example, in place thereof, as shown by FIG. 6A and FIG. 6B, a further stable engaging structure can be constituted by constituting the inclined face 116 only by a front end of the face along the peripheral direction of the projected portion 114 and providing a linear portion 117 at a base end portion thereof.

Further, although according to the above-described embodiment, there is adopted the case of providing the projected portion 114 at a part of the end portion of the circulation sleeve 18 as an example, in place thereof, as shown by FIG. 7A and FIG. 7B, a total of the end portion of the circulation sleeve 18 may be provided with the projected portion 114 having the inclined face 116. Thereby, a larger shift of the face of the circulation sleeve 18 can be dealt with. Further, the inclined faces 116 provided to the projected portion 114 and the recess portion 115 may be provided at a portion in the peripheral direction as shown by FIG. 8, further, may be provided at a total periphery in the peripheral direction.

Further, although according to the above-described embodiment, there is adopted a case of providing the inclined faces 116 to both of the projected portion 114 and the recess portion 115 as an example, the embodiment is not limited thereto but the inclined face 116 may be provided to either of the projected portion 114 and the recess portion 115. Further, although according to the above-described embodiment, there is adopted the case of providing the projected portion 114 to the side of the circulation sleeve 18 and providing the recess portion 115 to the side of the end cap 19 as the example, in place thereof, the recess portion 115 may be provided to the side of the circulation sleeve 18 and the projected portion 114 may be provided to the side of the end cap.

Second Embodiment

Figure 10:
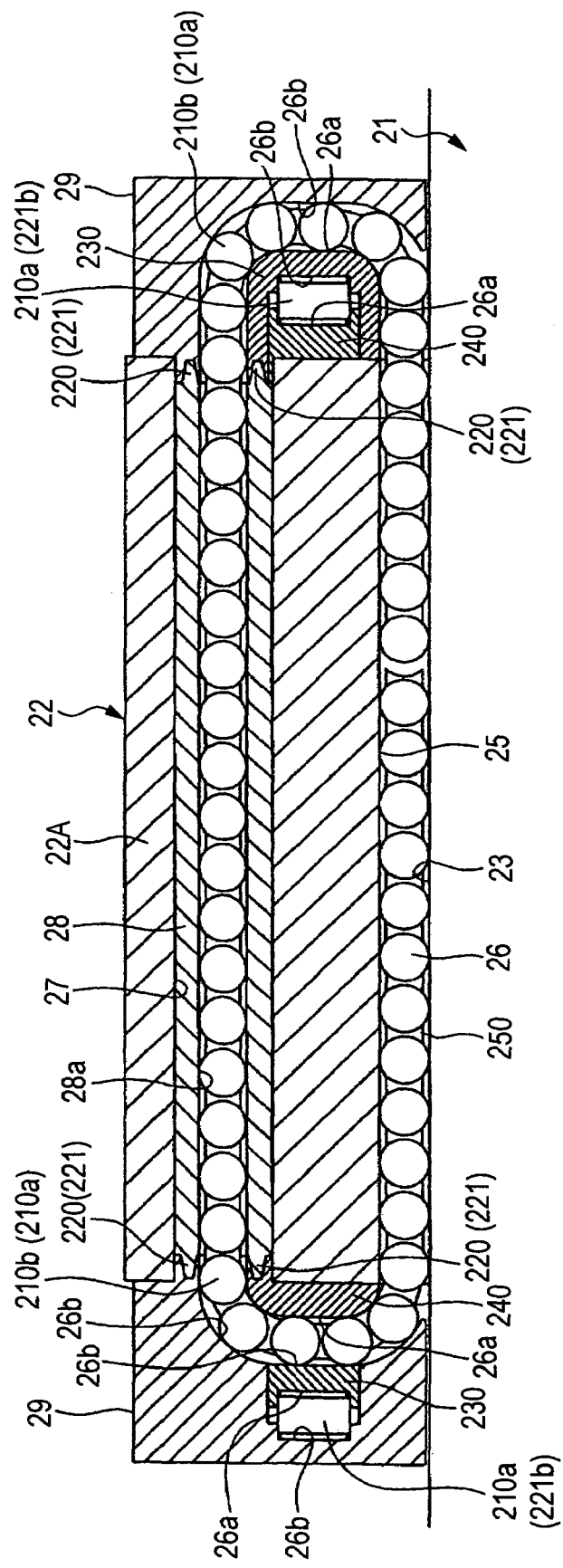
FIG. 10 is a sectional view of an essential portion of a slider for explaining a linear guide according to a second embodiment.
Figure 11:
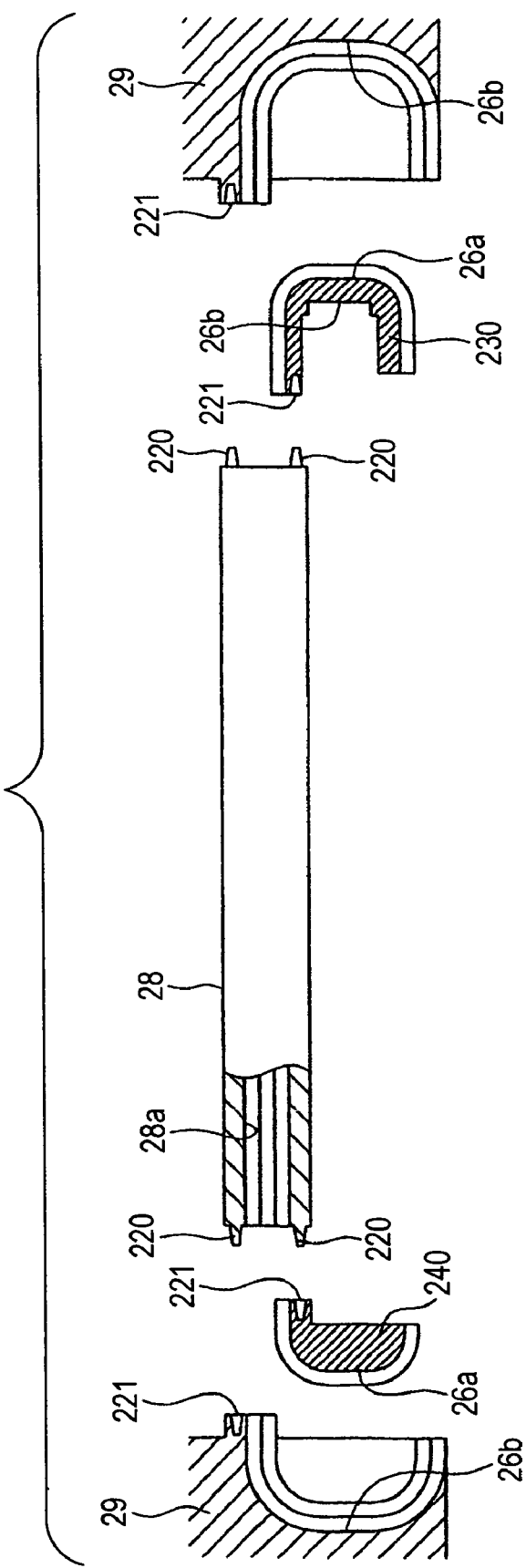
FIG. 11 is a disassembled view of an end cap, an inner peripheral track member and a circulation sleeve.
Figure 12A:
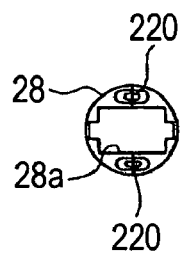
FIG. 12A and FIG. 12B are views viewing a circulation sleeve from an axial direction.
Figure 12B:
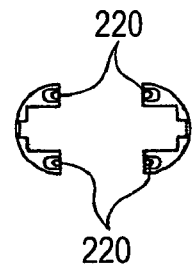
Figure 18:
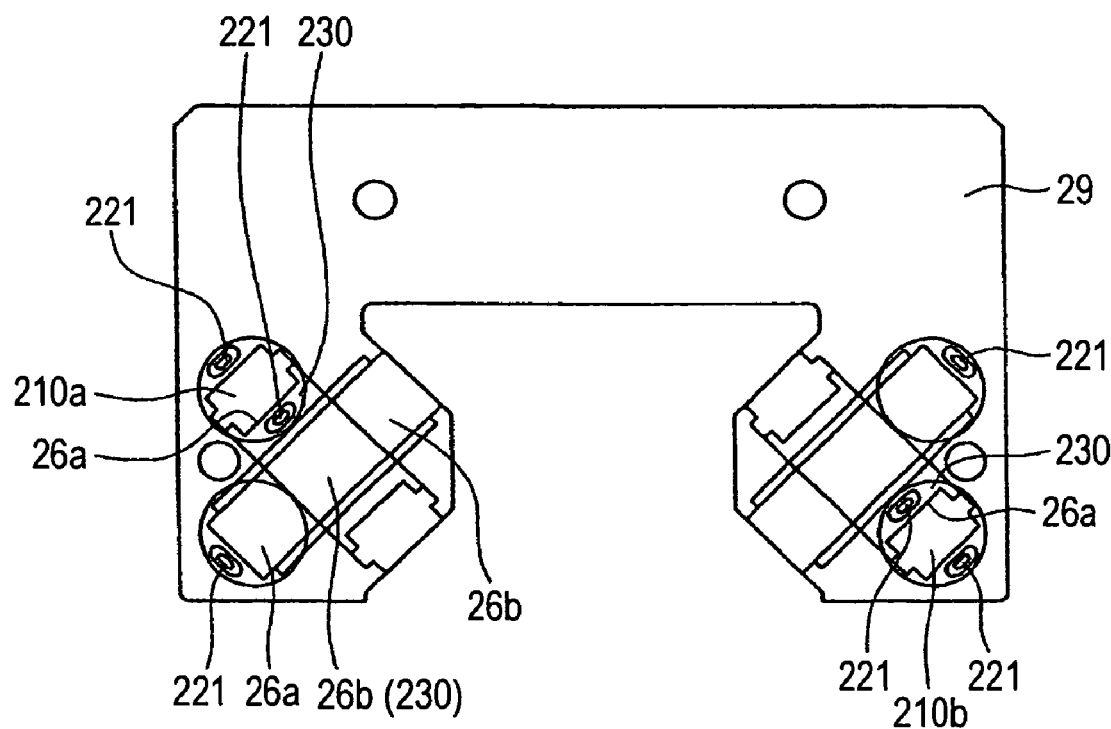
FIG. 18 is a view viewing an end cap from a side of an end face of a slider main body.

A second embodiment of the invention will be explained in reference to FIG. 10 thorough FIG. 18. FIG. 10 is a sectional view of an essential portion of a slider for explaining a linear guide according to the second embodiment, FIG. 11 is a disassembled view of an end cap, an inner peripheral track member and a circulation sleeve, FIG. 12A and FIG. 12B are views viewing a circulation sleeve from an axial direction, FIG. 13 is a view viewing an end cap from a side of an end face of a slider main body, FIG. 14 is a left side view of FIG. 13, and FIG. 15 through FIG. 18 are views for explaining a linear guide which is other example of the embodiment.

The linear guide of the embodiment is provided with a guide rail 21 extending in an axial direction and a slider 22 being laid across the guide rail 21 so as to relatively move along the axial direction. Two side faces in a width direction of the guide rail 21 are formed with rolling element rolling grooves 23 respectively extended in the axial direction by two upper and two lower streaks on one side, that is, four streaks in total, and a slider main body 22A of the slider 22 is formed with rolling element rolling grooves 25 respectively opposed to the rolling element rolling grooves 23 at inner side faces of two sleeve portions 24 thereof. A number of rollers 26 as rolling elements are rollably charged between the two rolling element rolling grooves 23, 25 and the slider 22 is made to be able to relatively move on the guide rail 21 along the axial direction through rolling of the rollers 26.

Although the rollers 26 interposed between the guide rail 21 and the slider 22 are moved to end portions in the axial direction of the slider 22 in accordance with the movement, in order to continuously move the slider 22 in the axial direction, it is necessary to infinitely circulate the rollers 26. For that purpose, two upper and two lower (a total of four) of holes 27 respectively penetrated in the axial direction are formed in the sleeve portions 24 on both sides of the slider main body 22A and the holes 27 are inserted with circulation sleeves 28 inner portions of which are made to constitute passages (rolling element passages) 28a of the rollers 26, a pair of end caps 29 as rolling element circulating parts are respectively fixed to both ends in the axial direction of the slider main body 22A by screws or the like, and the end caps 29 are formed with direction changing passages curved in a shape of a semicircular arc for communicating intervals between the two rolling element rolling grooves 23, 25 and the rolling element passages 28a to thereby form an infinite circulation track of the rollers 26.

Figure 13:
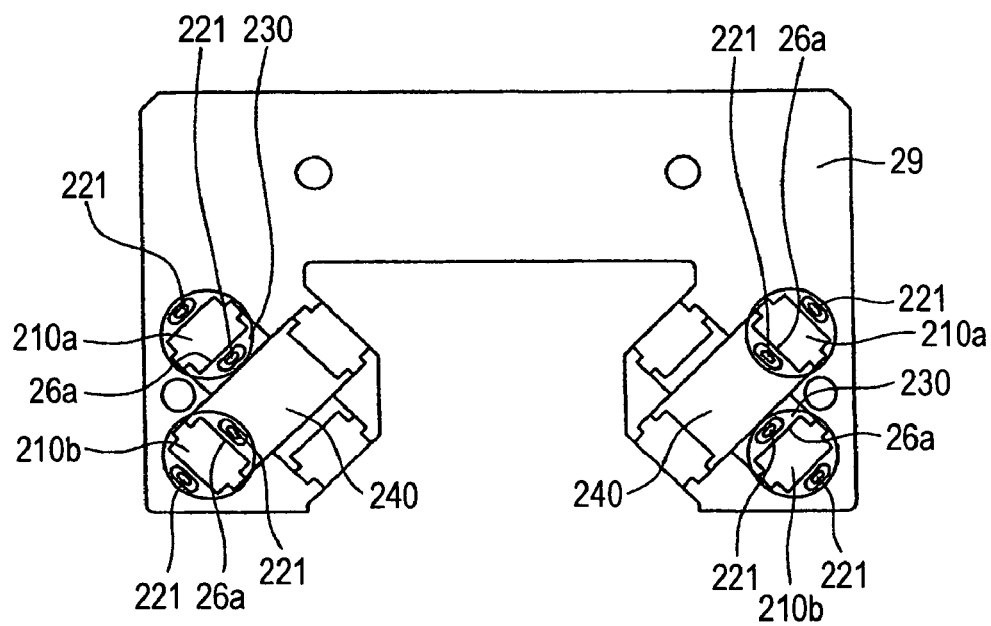
FIG. 13 is a view viewing an end cap from a side of an end face of a slider main body.
Figure 14:
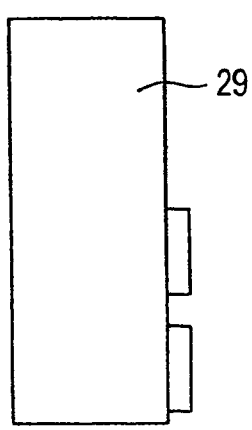
FIG. 14 is a left side view of FIG. 13.

According to the linear guide of the embodiment, as shown by FIG. 10, FIG. 13 and FIG. 14, a first return guide (inner peripheral track member) 230 is fitted in the axial direction of the guide rail 1 to a side of the end cap 29 directed to an end face of the slider main body 22A, a second return guide 240 (inner peripheral track member) is fitted in the axial direction of the guide rail 21 to the first return guide 230, and the first return guide 230 and the second return guide 240 are arranged substantially orthogonal to each other by constituting substantially a rectangular shape provided with an inner peripheral track face 26a of the cylindrical roller 26 on a side of a short side in view from the axial direction of the guide rail 21 (referred to FIG. 13).

Further, according to the embodiment, the one direction changing passage of the direction changing passage 210a for communicating the rolling element passage 28a on an upper side and a load track between the two rolling element rolling grooves 23, 25 on a lower side and a direction changing passage 210b for communicating the rolling element passage 28a on a lower side and a load track between the two rolling element rolling grooves 23, 25 on an upper side, is formed by the inner peripheral track face 26a of the first return guide 230 and an outer peripheral track face 26b of the end cap 29 on a left end side of FIG. 10 of the slider main body 22A, on a right end side of FIG. 10 of the slider main body 22A, one direction changing passage is formed by the inner peripheral track face 26a of the second return guide 240, the outer peripheral track face 26b of the first return guide 230 and the outer peripheral track face 26b of the end cap 29, another direction changing passage is formed by the inner peripheral track face 26a of the second return guide 240, the outer peripheral track face 26b of the first return guide 230 and the outer peripheral track face 26b of the end cap 29 on a left end side of FIG. 10 of the slider main body 22A, and on a right end side of FIG. 10 of the slider main body 22A, another direction changing passage is formed by the inner peripheral track face 26a of the first return guide and the outer peripheral track face 26b of the end cap 29.

Further, as shown by FIG. 10, the circulation sleeves 28 made of resin are inserted into holes 27 at four locations penetrating the slider main body 22A in the axial direction, and an inner peripheral portion of the circulation sleeve 28 is formed with the rolling element passage 28a having a square section through which the roller 26 can pass with more or less clearances therebetween. As shown by FIG. 12A and FIG. 12B, the circulation sleeve 28 is brought into a state of bonding members in a half divided shape in a diameter direction to facilitate fabrication by injection molding, further, a length in the axial direction of the circulation sleeve 28 is made to be a length substantially the same as that of the slider main body 22A.

Here, according to the embodiment, both end portions of the circulation sleeve 28 are provided to arrange with positioning projected portions (positioning locking portions) 220 in a taper shape respectively at two locations to be axis-symmetrical with respect to a center axis of the rolling element passage 28*a*, the first return guide 230, the second return guide 240 and the end cap 19 are provided with recess portions (locked portions) 221 in a taper shape fitted with the positioning projected portions 220, the positioning projected portions 220 at two locations of one end portion of the circulation sleeve 28 are fitted to the respective recess portions 221 of the second return guide 240 and the end cap 29, and the positioning projected portions 220 at two locations of another end portion are fitted to the respective recess portions 221 of the first return guide 230 and the end cap 29.

In this way, according to the embodiment, positioning of the circulation sleeve 28 and the end cap 29 as well as the first return guide 230 and the second return guide 240 can be carried out by simply fitting recesses and projections of the plurality of positioning projected portions 220 provide at end portions of the circulation sleeve 28 and the recess portions 221 provided at the end cap 29, the first return guide 230 and the second return guide 240. Therefore, it is not necessary to provide the end portions of the circulation sleeve 28 and the opening ends of the direction changing passages on the sides of the end caps 29 with recessed and projected portions having a complicated shape as in the related art. Thereby, time and labor of fabrication can be saved and low cost formation can be achieved.

Further, since the plurality of positioning projected portion 220 on the sides of the circulation sleeves 28 are respectively fitted to the recess portions 221 on the sides of the end caps 29 as well as the respective recess portions 221 of the first return guide 230 and the second return guide 240. Therefore, positioning of the circulation sleeves 28 and the end caps 29, the first return guide 230 and the second return guide 240 can accurately and firmly be carried out. Thereby, smooth circulation of the rollers 26 is ensured and operability of the linear guide can be improved.

Further, the positioning projected portion 220 and the recess portion 221 are formed in a taper shape. Therefore, even when there is more or less shift in the phase of the circulation sleeve 28, so far as the phase of the circulation sleeve 28 is constituted by a shift within the ranges of inclination of the taper faces of the positioning projected portions 220 and the recess portions 221, accurate positioning can be carried out by engaging the positioning projected portion 220 with the recess portion 221 easily by pushing the circulation sleeve 28. Further, the plurality of positioning projected portions 220 provided at the end portion of the circulation sleeve 28 are arranged to be axis-symmetrical with respect to the center axis of the rolling element passage 28*a* in the circulation sleeve 28. Therefore, even when the face of the circulation sleeve 28 is shifted by 180°, the positioning projected portion 220 on the side of the circulation sleeve 28 and the end cap 29 can be fitted to the respective recess portions 210 of, the first return guide 230 and the second return guide 240. Therefore, it is not necessary to paying attention to the face of the circulation sleeve 28 when the linear guide is integrated. Therefore, the integrating operation can be facilitated.

Further, the first return guide 230 fitted to the end cap 29 and the second return guide 240 fitted to the first return guide 230 are arranged substantially orthogonally to each other by constituting substantially the rectangular shape provided with the inner peripheral track face 26*a* of the roller 26 on the side of the short side in view from the axial direction of the slider main body 22A. Therefore, the shapes of the first return guide 230 and the second return guide 240 are simplified and a request for high mold accuracy can be avoided and operation of fitting the first return guide 230 and the second return guide 240 in the axial direction can easily be carried out. Therefore, efficient formation of the integrating operation. Therefore, low cost formation of fabrication cost can be achieved.

Further, the linear guide of the inventing is not limited to the above-described embodiment but can pertinently be changed within the range not deviated from the gist of the invention. For example, although according to the above-described embodiment, there is adopted the case of providing the plurality of positioning projected portions 220 at both end portions of the circulation sleeve 28 as an example, in place thereof, as shown by FIG. 15 and FIG. 16, the positioning projected portions 220 in the taper shape at two locations are provided only at one end portion (right end portion of FIG. 15 and FIG. 16) of the circulation sleeve 28 by being arranged to be axis-symmetrical with respect to the center axis of the rolling element passage 28*a*, and another end portion (left end portion of FIG. 15 and FIG. 16) of the circulation sleeve 28 may be integrally formed with a second return guide 240 (referred to FIG. 17) constituted by a half divided shape along with the circulation sleeve 28 and may be provided with the positioning projected portion 220 in the taper shape at one location.

Figure 15:
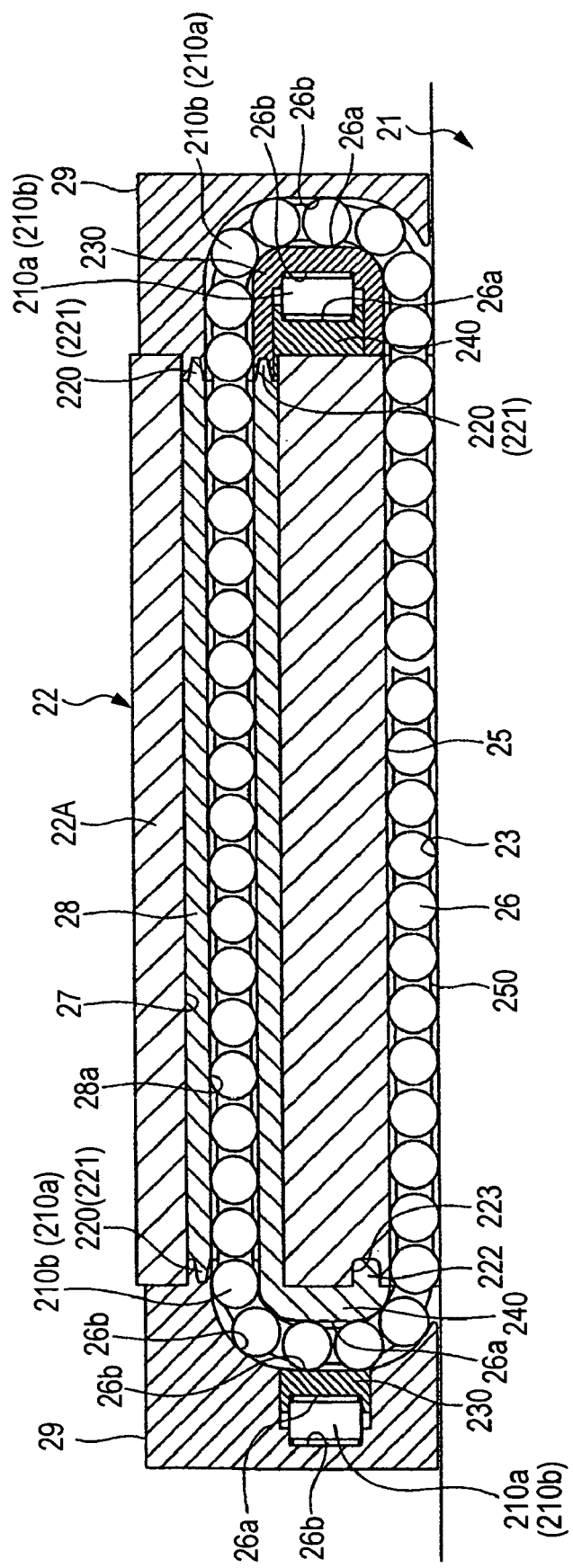
FIG. 15 is a sectionals view of an essential portion of a slider for explaining a linear guide according to other embodiment of the invention.
Figure 17A:
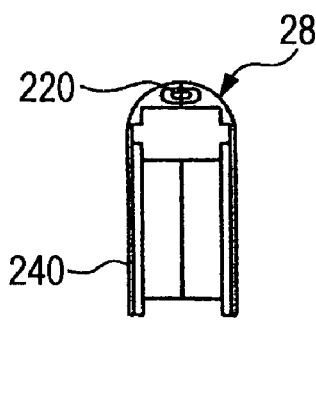
FIG. 17A and FIG. 17B are views viewing a circulation sleeve integrated with an inner peripheral track member from an axial direction.
Figure 17B:
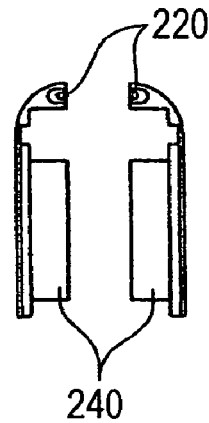

In this case, as shown by FIG. 15, FIG. 16 and FIG. 18, the recess portions 221 fitted with the positioning projected portions 220 are provided at the first return guide 230 and the end cap 29, the positioning projected portions 220 at two locations of one end portion of the circulation sleeve 28 are fitted to the respective recess portions 221 of the first return guide 230 and the end cap 29, the positioning projected portion 220 at one location of another end portion thereof is fitted to the recess portion 221 of the end cap 29, and the second return guide 240 integral with the circulation sleeve 28 is fitted to the first return guide 230 fitted to the end cap 29.

By integrally forming the second return guide 240 at another end portion of the circulation sleeve 28 in this way, the phase of the circulation sleeve 28 can be known at a glance by the second return guide 240. Therefore, the linear guide is not integrated by mistaking the phase of the circulation sleeve 28 and the integrating operation can further be facilitated. Further, according to the embodiment, by providing a projection 223 fitted to a fitting hole 222 provided at the end face of the slider main body 22A at the second return guide 240 provided integrally with the circulation sleeve 28 and fitting the projection 223 of the second return guide 240 to the fitting hole 222 of the slider main body 22A, the phase of the circulation sleeve 28 is determined.

Further, although according to the above-described embodiment, there is adopted the case of providing the positioning projected portions at the circulation sleeve and providing the recess portions fitted with the positioning projected portions at the end cap and the inner peripheral track member as the example, it is not necessarily needed to constitute in this way but the circulation sleeve may be provided with the positioning recess portions and the end cap and the inner peripheral track member may be provided with the projected portions fitted with the positioning recess portions, further, the circulation sleeve may be provided with the positioning projected portion and the positioning recess portion and the end cap and the inner peripheral track member may be provided with recessed and projected portions in correspondence therewith.

Third Embodiment

Figure 19:
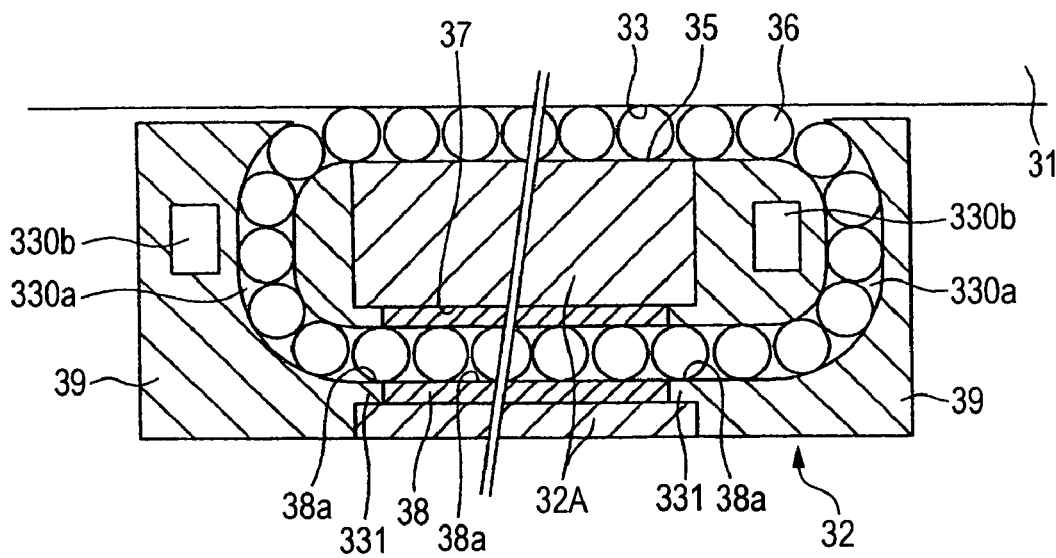
FIG. 19 is a sectional view of an essential portion of a slider for explaining a linear guide according to a third embodiment.
Figure 21:
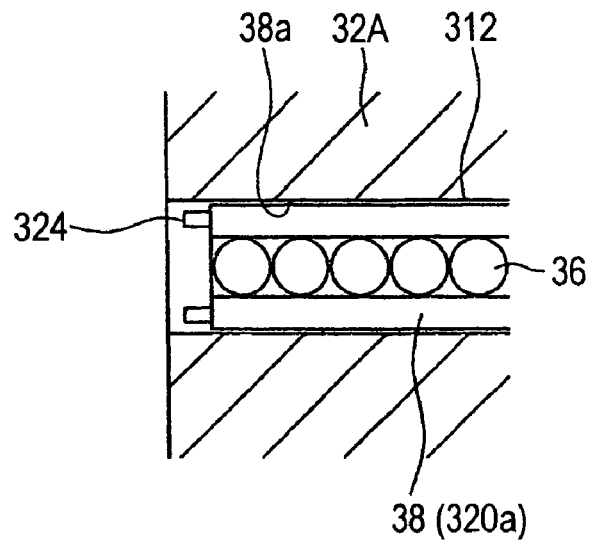
FIG. 21 is a sectional view taken along a line A-A of FIG. 20.
Figure 22:
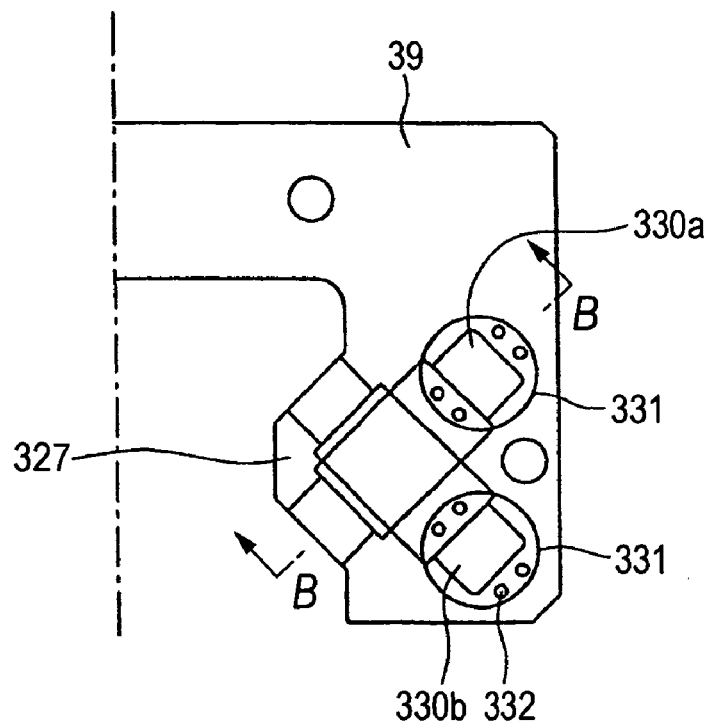
FIG. 22 is a view viewing an end cap from a side of an end face of a slider main body.
Figure 23:
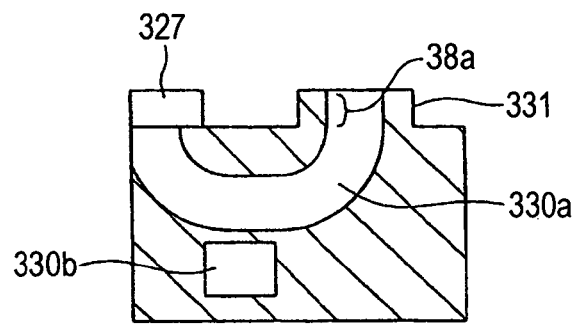
FIG. 23 is a sectional view taken along a line B-B of FIG. 22.
Figure 24:
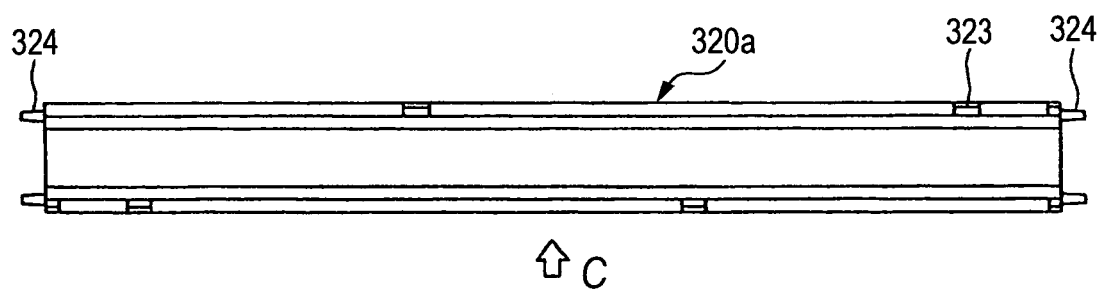
FIG. 24 is a view showing a half divided member of the circulation sleeve.
Figure 25:
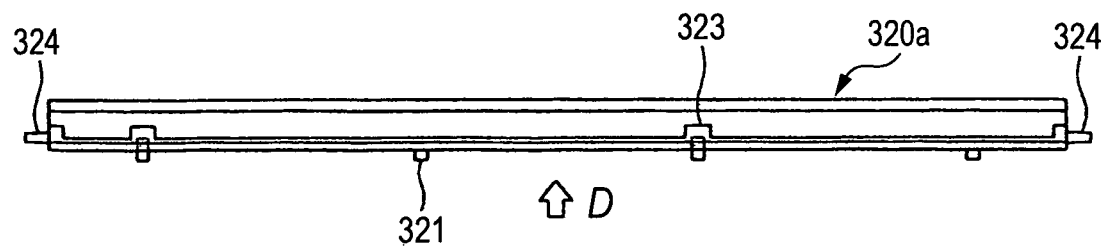
FIG. 25 is a view viewing the half divided member of the circulation sleeve from an arrow mark C direction of FIG. 24.
Figure 26:
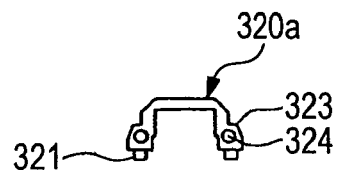
FIG. 26 is a right side view of FIG. 25.
Figure 27:
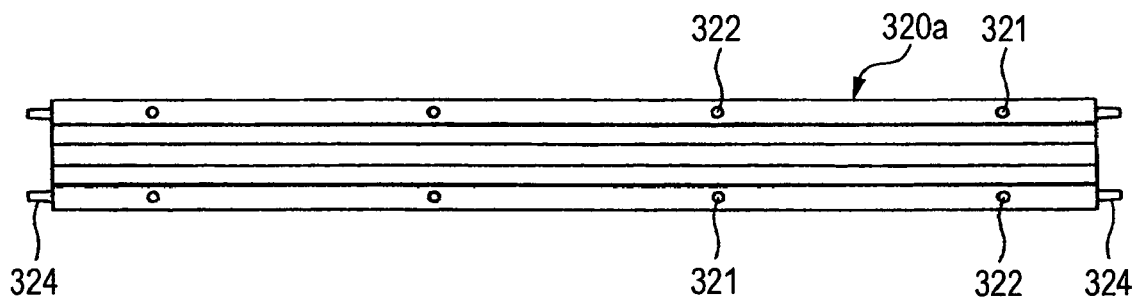
FIG. 27 is a view viewing the half divided member of the circulation sleeve from an arrow mark D direction of FIG. 25.
Figure 28:
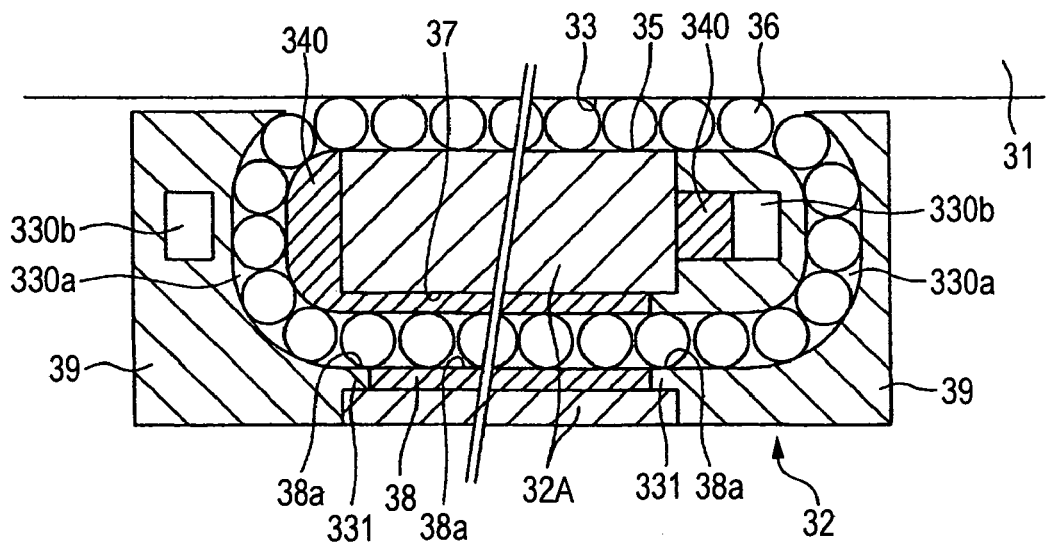
FIG. 28 is a sectional view of an essential portion of a slider for explaining a linear guide according to the other embodiment of the invention.

A third embodiment of the invention will be explained in reference to FIG. 19 through FIG. 28. FIG. 19 is a sectional view of an essential portion of a slider for explaining a linear guide according to a third embodiment, FIG. 20 is a view showing a side of an end face of a slider main body, FIG. 21 is a sectional view taken along a line A-A of FIG. 20, FIG. 22 is a view viewing an end cap from a side of an end face of a slider main body, FIG. 23 is a sectional view taken along a line B-B of FIG. 22, FIG. 24 is a view showing a half divided member of a circulation sleeve, FIG. 25 is a view viewing from an arrow mark C direction of FIG. 24, FIG. 26 is a right side view of FIG. 25, FIG. 27 is a view viewing from an arrow mark D direction of FIG. 25, and FIG. 28 is a sectional view of an essential portion of a slider for explaining a linear guide according to the other embodiment of the invention.

A linear guide of the embodiment is provided with a guide rail 31 extending in an axial direction and a slider 32 being laid across the guide rail 31 so as to relatively move along an axial direction. Two side faces in a width direction of the guide rail 31 are formed with rolling element rolling grooves 33 respectively in the axial direction by two upper and two lower streaks on one side, that is, four streaks in total, a slider main body 32A of the slider 32 is formed with rolling element rolling grooves 35 opposed to the rolling element rolling grooves 33 respectively at inner side faces of two sleeve portions 34 thereof. A number of rollers 36 as rolling elements are rollably charged between the two rolling element rolling grooves 33, 35 and the slider 32 can be moved relatively along the axial direction on the guide rail 31 through rolling of the rollers 36.

Although the rollers 36 interposed between the guide rail 31 and the slider 32 are rolled to move to end portions in the axial direction of the slider 32 in accordance with the movement, in order to continuously move the slider 32 in the axial direction, it is necessary to infinitely circulate the rollers 36. For that purpose, two upper and two lower (total of four) of holes 37 penetrated respectively in the axial direction are formed at insides of sleeve portions 34 on both sides of a slider main body 32A and the holes 37 are inserted with circulation sleeves 38 inner portions of which are made to constitute passages (rolling element passages) 38a of the rollers 36, a pair of end caps 39 respectively as rolling element circulating parts are fixed to both ends in the axial direction of the slider main body 32A via screws or the like and the end caps 39 are formed with direction changing passages curved in a shape of a semicircular arc for communicating intervals of the rolling element rolling grooves 33, 35 and the rolling element passages 38a to thereby form infinite circulation tracks of the rollers 36.

Figure 20:
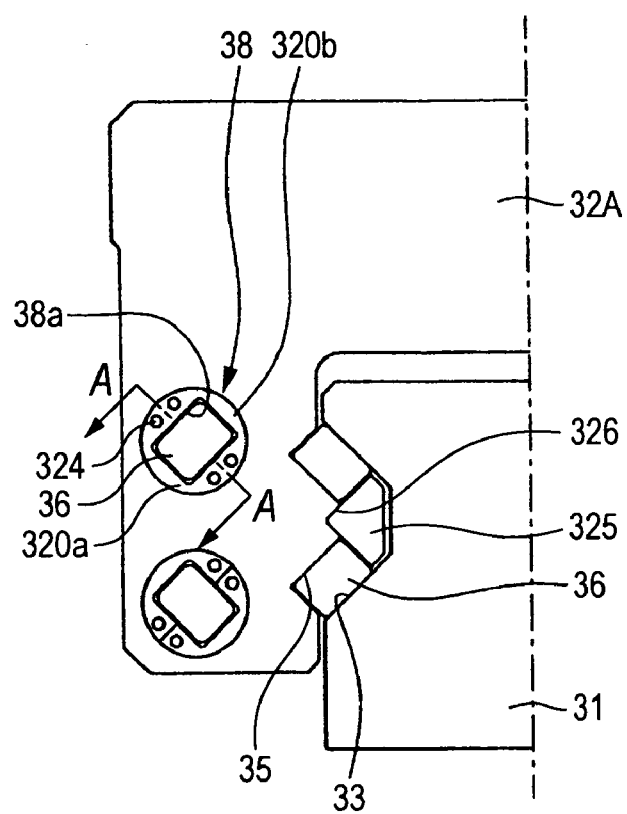
FIG. 20 is a view showing a side of an end face of the slider main body.

According to the linear guide of the embodiment, as shown by FIG. 19 and FIG. 20, the circulation sleeves 38 made of resin are inserted to the holes 37 at four locations penetrated in the axial direction of the slider main body 32A with clearances 312 therebetween, and inner peripheral portions of the circulation sleeves 38 are formed with the rolling element passages 38a having a square shape through which the rollers 36 can pass with more or less clearances therebetween. As shown by FIG. 20 and FIG. 21, the circulation sleeve 38 is formed by bonding half divided members 320a having substantially the same shape divided in two along the axial direction respectively in a diameter direction, specifically, as shown by FIG. 24 through FIG. 27, by fitting together projections 321 and recess portions 322 disposed at faces of overlapping the respective half divided member 320a, a single piece of the circulation sleeve 38 is formed. Further, a wall thickness of the half divided member 320a is made to be substantially constant and the half divided member 320a is provided with build-up portions 323 at respective locations for reinforcement. Further, a plurality of positioning projected portions 324 are projected from both end portions of the circulation sleeve 38 as an example of means for positioning with the end caps 39.

Holding members 325 (refer to FIG. 20) for holding the upper and lower rollers 36 are interposed between the two rolling element rolling grooves 33, 35 on an upper side and the two rolling element rolling grooves 33, 35 on a lower side, and positioning grooves 326 (refer to FIG. 22) of the end cap 39 are provided at end portions in the axial directions of the holding member 325. As shown by FIG. 22 and FIG. 23, inside of the end cap 39 is arranged with a direction changing passage 330a for communicating the rolling element passage 38a on an upper side and a load track between the two rolling element rolling grooves 33, 35 on a lower side and a direction changing passage 330b for communicating the rolling element passage 38a on a lower side and a load track between the two rolling element rolling grooves 33, 35 on upper side by being intersected three-dimensionally such that the direction changing passages do not interfere with each other.

The direction changing passage 330a is formed with an inner side track passage of the roller 36 at inside of the end cap 39 on an inner side of the direction changing passage 330b on a left end side of FIG. 19 and is formed with an outer side track passage of the roller 36 at inside of the end cap 39 on an outer side of the direction changing passage 330b on a right end side thereof. On the other hand, the direction changing passage 330b is formed with an outer side track passage of the roller 36 at inside of the end cap 39 on an outer side of the direction changing passage 330a on a left end side of FIG. 19 and is formed with an inner side track passage of the roller 36 at inside of the end cap 39 on an inner side of the direction changing passage 330a on a right end side thereof. Thereby, track lengths of the direction changing passages 330a, 330b are made to be the same track length.

Further, as shown by FIG. 22, a face of the end cap 39 directed to the side of the slider main body 32A is projected with a positioning projection 327 fitted to the positioning groove 326 provided at an end portion of the holding member 325. Here, according to the embodiment, respective opening ends of the direction changing passages 330a, 330b of the end cap 39 are formed with projections 331 inner portions of which are made to constitute portions of the rolling element passages 38a, the projections 331 are formed with recess portions 332 (refer to FIG. 22) in correspondence with the plurality of positioning projected portion 324 at the end portion of the circulation sleeve 38, a length in the axial direction of the circulation sleeve 38 is made to be shorter than a length in the axial direction of the slider main body 32A and the projection 331 is inserted into the hole 37 of the slider main body 32A, and the recess portion 332 is fitted to the positioning projected portion 324 to thereby accurately position the rolling element passage 38a of the circulation sleeve 38 and the direction changing passages 330a, 330b, thereby, the circulation sleeve 38 is positioned and supported at a regular position in a state of providing clearances 312 between the circulation sleeve 38 and the hole 37.

In this way, according to the embodiment, the opening ends of the direction changing passages 330a, 330b of the end cap 39 are integrally formed with the projections 331 inner portions of which are made to constitute portions of the rolling element passage 38a. Therefore, linear tracks constituting portions of the rolling element passage 38a are integrally formed with the opening ends of the direction changing passages 330a, 330b substantially in the circular arc shape on the side of the end cap 39. Therefore, a stepped difference can be avoided to be produced at portions of connecting with the linear tracks on the side of the circulation sleeve 38, smooth circulation of the roller 36 can be ensured and excellent operability can be achieved.

Further, since the length in the axial direction of the circulation sleeve 38 is made to be shorter than the length in the axial direction of the slider main body 32A, the projections 331 at the opening ends of the direction changing passages 330a, 330b are inserted into the holes 37 of the slider main body 32A. Therefore, a thickness in the axial direction of the end cap 39 can be minimized. Therefore, compact formation of the linear guide can be achieved by shortening the length of the total of the slider 32.

Further, the linear guide of the invention is not limited to the above-described embodiment but can pertinently be changed within the range not deviated of the gist of the invention. For example, as shown by FIG. 28, in the respective direction changing passages 330a, 330b, members 340 forming inner peripheral guide faces of the inner side track passages of the roller 36 may integrally be formed with the circulation sleeves 38. Thereby, the phase of the circulation sleeve 38 can be known at a glance by the member 340. Therefore, the linear guide is not integrated by mistaking the phase of the circulation sleeve 38. Therefore, the integrating operation can be facilitated.

Fourth Embodiment

Figure 29:
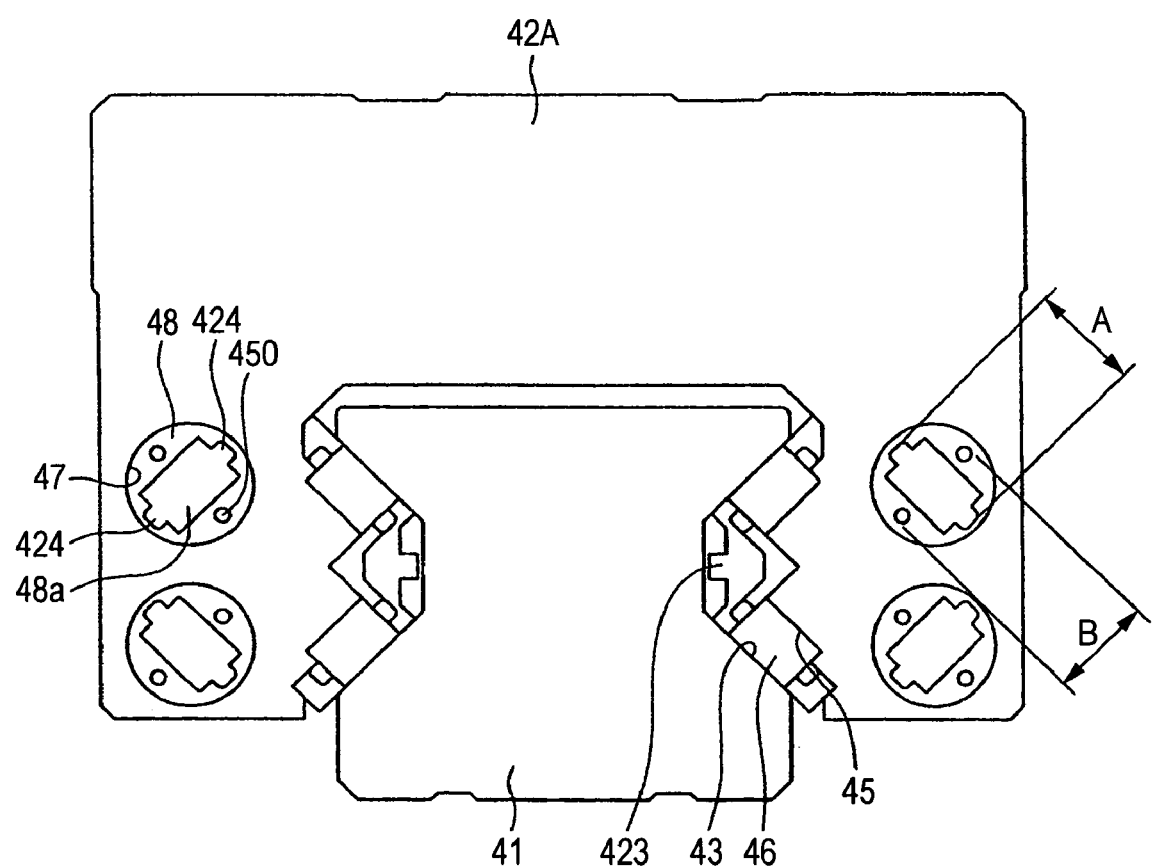
FIG. 29 is explanatory view for explaining a linear guide according to a fourth embodiment.

A fourth embodiment of the invention will be explained in reference to FIG. 29 through FIG. 34. FIG. 29 is an explanatory view for explaining a linear guide of a fourth embodiment, FIG. 30 is a sectional view of an essential portion of a slider, and FIG. 31 through FIG. 34 are views showing modified examples of a projected portion.

The linear guide of the embodiment is provided with a guide rail 41 extending in an axial direction and a slider 42 being laid across the guide rail 41 so as to relatively move along the axial direction. Two side faces in a width direction of the guide rail 41 are formed with rolling element rolling grooves 43 respectively extended in the axial direction by two upper and two lower streaks on one side, that is, four streaks in total, and inner side faces of two sleeve portions 44 of a slider main body 42A of the slider 42 are respectively formed with rolling element rolling grooves 45 opposed to the rolling element rolling grooves 43. A number of rollers 46 as rolling elements are rollably charged between the two rolling element rolling grooves 43, 45 and the slider 42 is made to be able to move on the guide rail 41 relatively along the axial direction.

Although the rollers 46 interposed between the guide rail 41 and the slider 42 are rolled to move to end portions in the axial direction of the slider 42 in accordance with the movement, in order to continuously move the slider 42 in the axial direction, it is necessary to infinitely circulate the rollers 46. For that purpose, insides of sleeve portions 44 on both sides of the slider main body 42A are formed with two upper and two lower (a total of four) of holes 47 respectively penetrated in the axial direction and the holes 47 are inserted with circulation sleeves 48 inner portions of which are made to constitute passages (rolling element passages) 48a of the rollers 46, both ends in the axial direction of the slider main body 42A are fixed with a pair of end caps 49 as rolling element circulation parts via screws or the like, and the end caps 49 are formed with direction changing passages curved in a shape of a semicircular arc for communicating intervals between the two rolling element rolling grooves 43, 45 and the rolling element passages 48a to thereby form infinite circulation tracks of the rollers 46.

Figure 30:
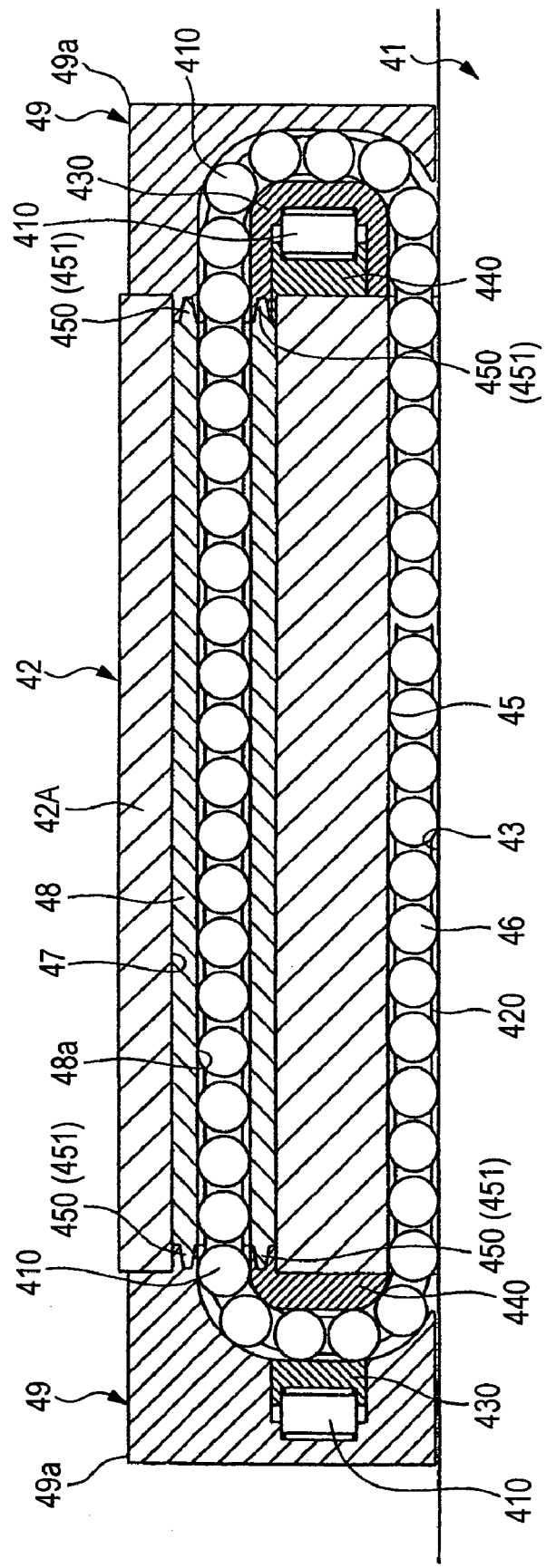
FIG. 30 is a sectional view of an essential portion of a slider.

According to the linear guide of the embodiment, as shown by FIG. 29 and FIG. 30, the end cap 49 is provided with an end cap main body 49a, a first return guide 430 and a second return guide 440, the first return guide 430 is fitted to a side of the slider main body 42A of the end cap main body 49a directed to an end face of the slider main body 42A in the axial direction of the guide rail 41, and the first return guide 430 is fitted with the second return guide 440 in the axial direction of the guide rail 41.

Further, according to the embodiment, by the end cap main body 49a, the first return guide 430 and the second return guide 440, there are formed a direction changing passage 410 for communicating the rolling element passage 48a on an upper side and a load track between the two rolling element rolling grooves 43, 45 on a lower side and a direction changing passage 410 for communicating the rolling element passage 48a on a lower side and a load track between the two rolling element rolling grooves 43, 45 on an upper side. Further, circulation sleeves 48 made of resin are inserted into the holes 47 at four locations penetrated through the slider main body 42A in the axial direction, and inner peripheral portions of the circulation sleeves 48 are formed with rolling element passages 48a having a square section through which the rollers 46 of the rolling elements can pass with more or less clearances therebetween.

Here, according to the embodiment, both end portions of the circulation sleeve 48 are respectively provided with positioning projected portions (fitting portions) 450 in a taper shape at two locations to be axis-symmetrical in a direction of a short side of the rolling element passage 48a with respect to a center axis of the rolling element passage 48a, the end caps 49 are provided with recess portions (fitted portions) 451 in a taper shape fitted to the positioning projected portions 450, and the positioning projected portions 450 at two locations on a side of the circulation sleeve 48 are fitted to the respective recess portions 451 on a side of the end cap 49.

Meanwhile, in reference to FIG. 29, when a dimension between bottom portions of guide grooves 424 constituting portions of the circulation sleeve opposed to each other is designated by notation A and a dimension between outer side faces of the projected portions 450 at two locations provided at an end portion of the circulation sleeve 48 is designated by notation B, in the case of A≧B, in fitting the projected portion 450 on the side of the circulation sleeve 48 to the recess portion 451 on the side of the end cap 49, there is a possibility that a failure in integration is brought about by erroneously fitting the projected portion 450 to the guide groove 424 on the side of the end cap 49. The failure in integration is found after the slider 42 has been finished to integrate and the rollers 46 are inserted. Therefore, when the integration is carried out again thereafter, enormous time and labor are wasted. In this case, an operational efficiency is lowered and integration cost is increased.

Hence, according to the embodiment, when the dimension between the bottom portions of the guide groove 424 opposed to each other is designated by notation A and the dimension between the outer guide faces of the projected portions 450 at two locations provided at the end portion of the circulation sleeve 48 is designated by notation B, by constituting A<B, the projected portion 450 is arranged to be unable to fit to the guide groove 424 on the side of the end cap 49. Thereby, the possibility of bringing about the failure in integration is eliminated by firmly preventing the projected portion 450 from being erroneously fitted to the guide groove 424 on the side of the end cap 49 when the projected portion 450 on the side of the circulation sleeve 48 is fitted to the recess portion 451 on the side of the end cap 49.

In this way, according to the embodiment, by simply fitting recesses and projections of the plurality of positioning projected portions 450 provided at the end portion of the circulation sleeve 48 and the recess portions 451 on the side of the end cap 49, positioning of the circulation sleeve 48 and the end cap 49 can be carried out. Therefore, positioning of the circulation sleeve 48 and the end cap 49 can accurately and firmly be carried out. Thereby, smooth circulation of the rollers 46 can be ensured and the operability of the linear guide can be improved.

Further, since the projected portions 450 on the side of the circulation sleeve 48 are arranged to be unable to fit to the guide grooves 424 on the side of the end cap 49, when the projected portions 450 on the side of the circulation sleeve 48 are fitted to the recess portions 451 on the side of the end cap 49, the projected portions 450 can firmly be prevented from being erroneously fitted to the guide grooves 424 on the side of the end cap 49. Thereby, the possibility of bringing about the failure in integration is eliminated and promotion of the operational efficiency and a reduction in integration cost can be achieved.

Figure 31:
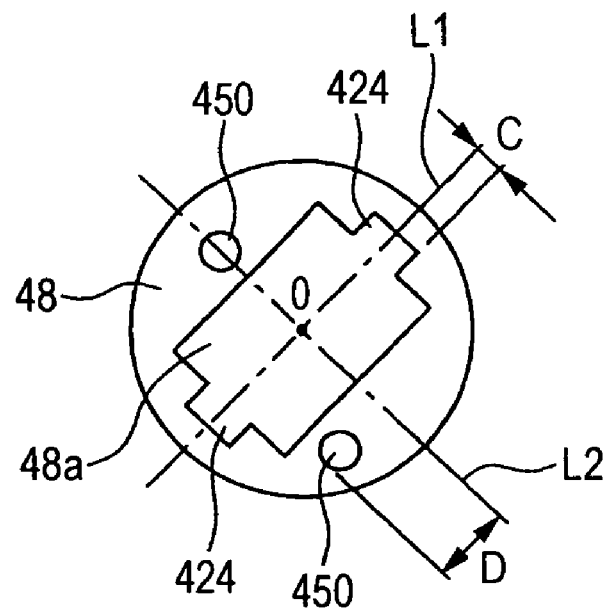
FIG. 31 is a view showing a modified example of arranging a projected portion.
Figure 32:
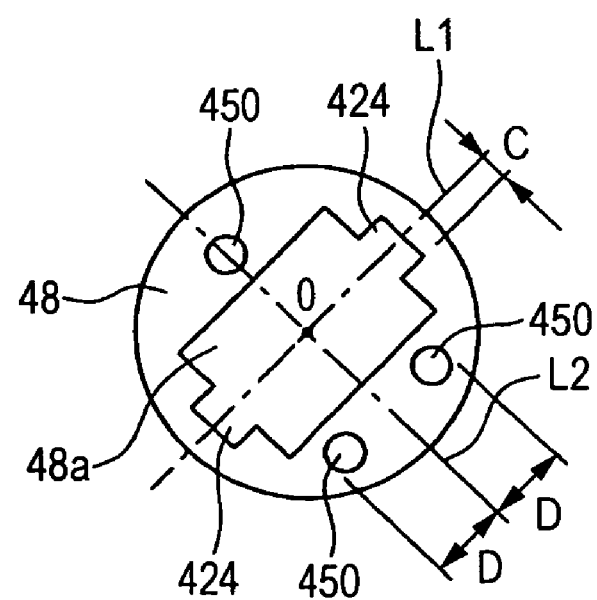
FIG. 32 is a view showing a modified example of arranging a projected portion.
Figure 33:
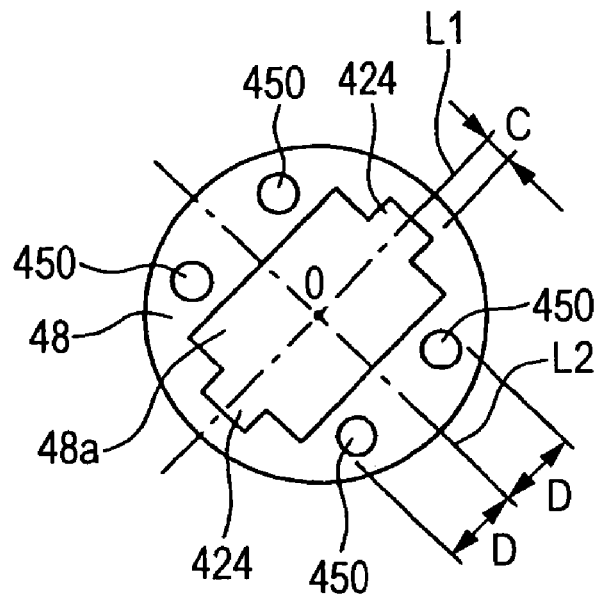
FIG. 33 is a view showing a modified example of arranging a projected portion.

Further, the linear guide of the invention is not limited to the above-described embodiment but can pertinently be changed within the range not deviated from the gist of the invention. For example, although according to the above-described embodiment, there is adopted the case in which the both end portions of the circulation sleeve 48 are provided with the positioning projected portions 450 respectively at two locations to be axis-symmetrical in the direction of the short side of the rolling element passage 48a with respect to the center axis of the rolling element passage 48a as an example, in place thereof, as shown by FIG. 31, one of the projected portions 450 at two locations may be arranged to shift, further, as shown by FIG. 32 and FIG. 33, the projected portions 450 may be arranged at three locations and four locations, or five or more locations.

Figure 34:
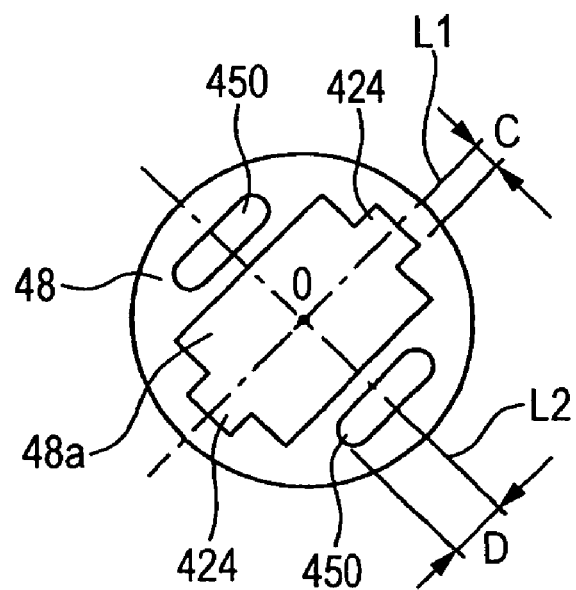
FIG. 34 is a view showing a modified example of a shape of a projected portion.
Figure 35:
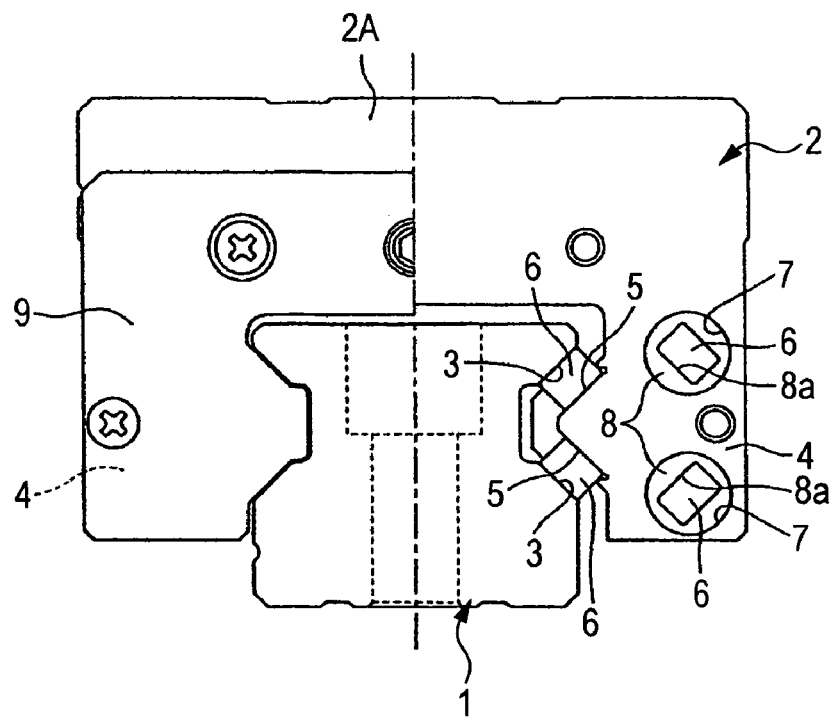
FIG. 35 is a view chipping a part of an end cap for explaining a linear guide of a related art.
Figure 36:
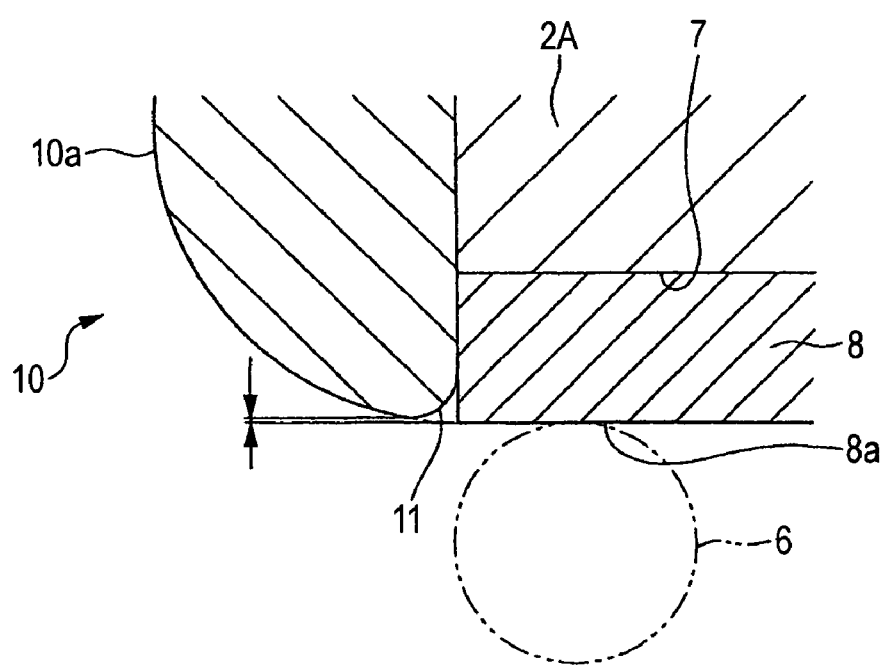
FIG. 36 is an explanatory view for explaining a part of connecting a direction changing passage on a side of an end cap and a rolling element passage on a side of a circulation sleeve.

Further, although according to the above-described embodiment, there is exemplified the case of constituting the projected portion 450 by the section in the circular shape, the sectional shape of the projected portion 450 is not particularly limited but the section may be constituted by an oval shape as shown by, for example, FIG. 34. In any cases of FIG. 31 through FIG. 34, when a line passing center O of the circulation sleeve 48 and connecting the bottom portions of the guide groove 424 opposed to each other is defined as a center line L1, a line passing the center O of the circulation sleeve 48 and orthogonal to the center line L1 is defined as a center line L2, a dimension from center line L1 to an inner side face of the guide groove 424 is designated by notation C, and a longest dimension from the center line L2 to the projected portion 450 is designated by notation D, in the case of C≧D, there is a possibility of bringing about a failure in integration by erroneously fitting the projected portion 450 to the guide groove 424 on the side of the end cap 49 when the projected portion 450 on the side of the circulation sleeve 48 is fitted to the recess portion 451 on the side of the end cap 49. When C<D is constituted, the projected portion 450 is made to be unable to fit to the guide groove 424 on the side of the end cap 49 and when the projected portion 450 on the side of the circulation sleeve 48 is fitted to the recess portion 451 on the side of the end cap 49, the projected portion 450 can firmly be prevented from being erroneously fitted to the guide groove 424 on the side of the end cap 49. Thereby, the possibility of bringing about the failure in integration is eliminated and operation and effect similar to those of the above-described embodiment can be achieved.

Further, although according to the above-described embodiment, there is adopted the case in which the projected portion 450 is provided on the side of the circulation sleeve 48 and the recess portion 451 is provided on the side of the end cap 49 as an example, in place thereof, the recess portion 451 may be provided on the side of the circulation sleeve 48 and the projected portion 450 may be provided on the side of the end cap 49. Furthermore, although according to the above-described embodiment, there is shown an example of arranging the projected portion 450 on the side of the circulation sleeve 48 to be unable to fit to the guide groove 424 on the side of the end cap 49, when the guide groove 424 is not provided, the projected portion 450 may be arranged to be unable to fit to the rolling element passage on the side of the end cap 49.

Although according to the four embodiments explained above, an explanation has been given by taking an example of the roller as the rolling element, the rolling element may be a ball.

What is claimed is:

1. A linear guide comprising:
a guide rail which has a rolling element rolling groove extending in an axial direction; and
a slider which has a rolling element rolling groove opposed to the rolling element rolling groove of the guide rail, and is laid across the guide rail so as to relatively move along the axial direction through rolling movements of a number of rolling elements inserted into a load track formed between the two rolling element rolling grooves, wherein the slider has:
a slider main body which has a circulation sleeve whose inner portion forms a rolling element passage by being inserted into a hole penetrating in the axial direction;
an end cap which has an outer peripheral track face of a direction changing passage in a curved shape for communicating the load track and the rolling element passage, and is fixed to an axial end portion of the slider main body; and
an inner peripheral track member which has an inner track face of the direction changing passage, and is fitted to a side of the end cap directed to a side of an end face of the slider main body,
wherein an end portion of the circulation sleeve is provided with a plurality of positioning locking portions, and the end cap and the inner peripheral track member are respectively provided with locked portions fitted with the positioning locking portions,
wherein another end portion of the circulation sleeve is integrally formed with the inner Peripheral track member,
wherein the locking portions include one of a projected portion and a recessed portion, and the locked portions include the other of the projected portion and the recessed portion, and
wherein at least one of the projected portion and the recess portion has an inclined face along a peripheral direction of an end face of the circulation sleeve.

2. The linear guide according to claim 1, wherein the rolling element is a roller.

3. The linear guide according to claim 1,
wherein an opening end portion of the end cap protrudes toward the circulation sleeve from a flat side surface of the end cap, and
wherein the protruded opening and portion is integrated with the end cap.

4. A linear guide, comprising:
a guide rail which has a rolling element rolling groove extending in an axial direction; and a slider which has a rolling element rolling groove opposed to the rolling element rolling groove of the guide rail, and is laid across the guide rail so as to relatively move along the axial direction through rolling movements of a number of rolling elements inserted into a load track formed between the two rolling element rolling grooves, wherein the slider has:

a slider main body which has a circulation sleeve whose inner portion forms a rolling element passage by being inserted into a hole penetrating in the axial direction;

an end cap which has an outer peripheral track face of a direction changing passage in a curved shape for communicating the load track and the rolling element passage, and is fixed to an axial end portion of the slider main body; and an inner peripheral track member which has an inner track face of the direction changing passage, is fitted to a side of the end cap directed to a side of an end face of the slider main body, wherein an end portion of the circulation sleeve is provided with a plurality of positioning locking portions, and the end cap and the inner peripheral track member are respectively provided with locked portions fitted with the positioning locking portions, wherein another end portion of the circulation sleeve is integrally formed with the inner peripheral track member, wherein the load tracks are formed by two upper and two lower streaks on one side, four streaks in total, wherein the rolling element passages are formed by two upper and two lower passages on one side, four passages in total, wherein the inner peripheral track member is formed by a first return guide and a second return guide which are fitted to a side of the end cap member directed to the side of the end face the slider main body, wherein a side of one return guide of the first return guide and the second return guide is formed with the direction changing passage for communicating the rolling element passage on an upper side and the load track on a lower side, wherein a side of another return guide is formed with the direction changing passage for communicating the rolling element passage on a lower side and the load track on an upper side, and wherein the first return guide and the second return guide are fitted in the axial direction of the guide rail in a state of being arranged substantially orthogonal to each other by constituting substantially a rectangular shape on a short side thereof provided with the inner peripheral track face of the rolling element in view from the axial direction of the guide rail.

5. The linear guide according to claim 4, wherein the rolling element is a roller.

6. The linear guide according to claim 4, wherein an opening end portion of the end cap protrudes toward the circulation sleeve from a flat side surface of the end cap, and wherein the protruded opening end portion is integrated with the end cap.

* * * * *